United States Patent
Ito et al.

(10) Patent No.: US 10,294,547 B2
(45) Date of Patent: May 21, 2019

(54) COPPER ALLOY FOR ELECTRONIC AND ELECTRICAL EQUIPMENT, PLASTICALLY WORKED COPPER ALLOY MATERIAL FOR ELECTRONIC AND ELECTRICAL EQUIPMENT, AND COMPONENT AND TERMINAL FOR ELECTRONIC AND ELECTRICAL EQUIPMENT

(71) Applicant: MITSUBISHI MATERIALS CORPORATION, Tokyo (JP)

(72) Inventors: Yuki Ito, Okegawa (JP); Kazunari Maki, Saitama (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 495 days.

(21) Appl. No.: 14/907,193

(22) PCT Filed: Jul. 29, 2014

(86) PCT No.: PCT/JP2014/069942
§ 371 (c)(1),
(2) Date: Jan. 22, 2016

(87) PCT Pub. No.: WO2015/016218
PCT Pub. Date: Feb. 5, 2015

(65) Prior Publication Data
US 2016/0160321 A1    Jun. 9, 2016

(30) Foreign Application Priority Data

Jul. 31, 2013 (JP) .................................. 2013-159642
Jun. 6, 2014 (JP) .................................. 2014-117998

(51) Int. Cl.
*C22C 9/00* (2006.01)
*C22F 1/08* (2006.01)
(Continued)

(52) U.S. Cl.
CPC ................. *C22C 9/00* (2013.01); *C21D 8/00* (2013.01); *C21D 9/0068* (2013.01); *C22F 1/08* (2013.01);
(Continued)

(58) Field of Classification Search
None
See application file for complete search history.

(56) References Cited

U.S. PATENT DOCUMENTS 4,337,785 A * 7/1982 Sato .......................... C22C 9/00
                                                                137/1
7,789,977 B2 * 9/2010 Muroga .................... C22C 9/02
                                                              148/432

(Continued)

FOREIGN PATENT DOCUMENTS

EP      2343388 A      7/2011
JP      58-128292 A    7/1983
(Continued)

OTHER PUBLICATIONS

Translation of JP 2012-158829 (publihed Aug. 23, 2012) from J-Plat Pat.*

(Continued)

*Primary Examiner* — George Wyszomierski
(74) *Attorney, Agent, or Firm* — Leason Ellis LLP

(57) ABSTRACT

The present invention provides a copper alloy for electronic and electronic device which has excellent mechanical properties and is capable of suppressing generation of defects even in a case in which the copper alloy is worked to a thin plate thickness or a smaller wire diameter than in the related art, a plastically-worked copper alloy material, and a component and a terminal for electronic and electronic device. The copper alloy for electronic and electronic device of the present invention includes Mg in a range of 1.3 mass % to (Continued)

2.8 mass % with a remainder substantially being Cu and inevitable impurities, in which a content of H is set to 10 mass ppm or lower, a content of O is set to 100 mass ppm or lower, a content of S is set to 50 mass ppm or lower, and a content of C is set to 10 mass ppm or lower.

13 Claims, 4 Drawing Sheets

(51) Int. Cl.
    *C21D 8/00*     (2006.01)
    *C21D 9/00*     (2006.01)
    *C23C 30/00*    (2006.01)
    *H01R 13/03*    (2006.01)
    *C22F 1/00*     (2006.01)
    *H01R 4/58*     (2006.01)

(52) U.S. Cl.
    CPC .......... *C23C 30/005* (2013.01); *H01R 13/03* (2013.01); *C22F 1/00* (2013.01); *H01R 4/58* (2013.01); *Y02P 10/212* (2015.11)

(56) References Cited

U.S. PATENT DOCUMENTS

| | | | |
|---|---|---|---|
| 9,587,299 B2 * | 3/2017 | Maki | ............... C22C 9/00 |
| 2009/0017325 A1 | 1/2009 | Muroga et al. | |
| 2013/0048162 A1 * | 2/2013 | Ito | ............... C22F 1/08 |
| | | | 148/684 |
| 2014/0096877 A1 | 4/2014 | Maki et al. | |

FOREIGN PATENT DOCUMENTS

| | | |
|---|---|---|
| JP | 04-350137 A | 12/1992 |
| JP | 07-018354 A | 1/1995 |
| JP | 10-219372 A | 8/1998 |
| JP | 11-199954 A | 7/1999 |
| JP | 11-256256 A | 9/1999 |
| JP | 2002-038227 A | 2/2002 |
| JP | 2002-275563 A | 9/2002 |
| JP | 2009-019232 A | 1/2009 |
| JP | 2011-153338 A | 8/2011 |
| JP | 2011-241413 A | 12/2011 |
| JP | 2012-158829 * | 8/2012 |
| JP | 5045783 B | 10/2012 |
| JP | 2012-251226 A | 12/2012 |
| JP | 2013-100569 A | 5/2013 |
| JP | 2013-100570 A | 5/2013 |
| JP | 2013-100571 A | 5/2013 |
| JP | 2013-104096 A | 5/2013 |
| JP | 2013-104101 A | 5/2013 |
| TW | 201313924 A | 4/2013 |
| WO | WO-2011/024909 A | 3/2011 |

OTHER PUBLICATIONS

Nomura et al. "Technical Trends in High Performance Copper Alloy Strip for Connector and Kobe Steel's Development Strategy", *Kobe Steel engineering reports*, 2004, pp. 2-8, vol. 54, No. 1.

Hori et al., "Grain Boundary Precipitation in Cu—Mg alloy", *Journal of the Japan Copper and Brass Research Association*, 1980, pp. 115-124, vol. 19.

International Search Report dated Nov. 4, 2014 for the corresponding PCT Application No. PCT/JP2014/069942.

Office Action dated May 25, 2015 for the corresponding Taiwanese Application No. 103125685.

Office Action dated Sep. 24, 2015 for the corresponding Japanese Application No. 2014-117998.

Office Action dated Mar. 1, 2016 for the corresponding Japanese Patent Application No. 2014-117998.

European Search Report dated Feb. 9, 2017 for the corresponding European Patent Application No. 14831793.6.

S. Pattberg et al., "Determination of trace impurities in high purity copper using sector-field ICP-MS: continuous nebulization, flow injection analysis and laser ablation" *Fresenius J Anal Chem*, 1999, pp. 410-416, Springer-Verlag 1999.

Office Action dated Sep. 12, 2018 for the corresponding European Patent Application No. 14831793.6.

* cited by examiner

COPPER ALLOY FOR ELECTRONIC AND ELECTRICAL EQUIPMENT, PLASTICALLY WORKED COPPER ALLOY MATERIAL FOR ELECTRONIC AND ELECTRICAL EQUIPMENT, AND COMPONENT AND TERMINAL FOR ELECTRONIC AND ELECTRICAL EQUIPMENT

CROSS-REFERENCE TO RELATED PATENT APPLICATIONS

This application is a U.S. National Phase application under 35 U.S.C. § 371 of International Patent Application No. PCT/JP2014/069942, filed Jul. 29, 2014, and claims the benefit of Japanese Patent Applications No. 2013-159642, filed Jul. 31, 2013 and No. 2014-117998, filed Jun. 6, 2014, all of which are incorporated herein by reference in their entireties. The International application was published in Japanese on Feb. 5, 2015 as International Publication No. WO/2015/016218 under PCT Article 21(2).

FIELD OF THE INVENTION

The present invention relates to a copper alloy for electronic and electrical devices which is used as a component for electronic and electrical devices such as a terminal such as a connector in a semiconductor device, a movable conductive piece for an electromagnetic relay, and a lead frame, a plastically-worked copper alloy material for electronic and electrical devices for which the same copper alloy for electronic and electrical devices is used, and a component and a terminal for electronic and electrical devices.

BACKGROUND OF THE INVENTION

Thus far, in response to the size reduction of an electronic device, electrical device, and the like, there have been attempts to reduce the size and thickness of components for electronic and electrical devices such as a terminal such as a connector, a relay, and a lead frame which are used in the electronic devices or the electrical devices. Therefore, as a material constituting components for electronic and electrical devices, there has been a demand for a copper alloy having excellent properties, strength, and bendability. Particularly, as described in NPL 1, a copper alloy which is used for components for electronic and electrical devices such as a terminal such as a connector, a relay, and a lead frame desirably has a high proof strength.

As a copper alloy that is used for components for electronic and electrical devices such as a terminal such as a connector, a relay, and a lead frame, the Cu—Mg alloy described in NPL 2, the Cu—Mg—Zn—B alloy described in PTL 1, and the like have been developed.

As is clear from the phase diagram of a Cu—Mg system illustrated in FIG. 1, in the Cu—Mg-based alloy, in a case in which the content of Mg is 1.3% by mass or higher (3.3% by atom or higher), an intermetallic compound made up of Cu and Mg can be precipitated by performing a solution treatment and a precipitation treatment. That is, in the Cu—Mg-based alloy, it becomes possible to obtain relatively high conductivity and strength by means of precipitation hardening.

However, in the Cu—Mg-based alloy described in NPL 2 and PTL 1, since there are many coarse intermetallic compounds, which include Cu and Mg as major components, dispersed in the matrix, cracking and the like are likely to occur from this intermetallic compound, which serves as a starting point during bending working, and thus there has been a problem in that a component for electronic and electrical devices having a complicated shape cannot be metal-formed.

Particularly, in components for electronic and electrical devices which are used for commercial products such as a mobile phone and a personal computer, there is a demand for a reduction of size and weight, and a copper alloy for electronic and electrical devices satisfying both strength and bendability is required. However, in a precipitation-hardened alloy such as the above-described Cu—Mg-based alloy, when strength and proof strength are improved by means of precipitation hardening, bendability significantly degrades. Therefore, it has been impossible to shape a thin component for electronic and electrical devices having a complicated shape.

Therefore, in PTL 2, a work-hardened copper alloy of a Cu—Mg supersaturated solid solution produced by quenching a Cu—Mg alloy after formation of a solid solution thereof is proposed.

Such a Cu—Mg alloy has excellent strength, conductivity, and bendability in a balanced manner and is particularly suitable as a material for the above-described components for electronic and electrical devices.

CITATION LIST

Patent Literature

[PTL 1] Japanese Unexamined Patent Application, First Publication No. H7-018354
[PTL 2] Japanese Patent No. 5045783

Non-Patent Literature

[NPL 1] Koya Nomura, "The technical trend of high-performance copper alloy strip for a connector and the development strategy of our company", Kobe Steel Works Engineering report Vol. 54 No. 1 (2004), pp. 2 to 8
[NPL 2] Shigenori Hori, et al., "Grain boundary precipitation in a Cu—Mg alloy", Journal of the Japan Copper and Brass Research Association Vol. 19 (1980), pp. 115 to 124

Technical Problem

Meanwhile, in recent years, in response to an additional weight reduction of electronic and electrical devices, there has been a demand for a reduction of the thickness and size of components for electronic and electrical devices such as a terminal such as a connector, a relay, and a lead frame which are used in the electronic devices or the electrical devices. Therefore, in a plastically-worked copper alloy material for electronic and electrical devices which serves as a material for components for electronic and electrical devices, there has been a demand for working the material to a thinner plate thickness or a smaller wire diameter than in the related art.

Therefore, in a case in which a copper alloy for electronic and electrical devices includes a number of coarse inclusions such as an oxide therein, there has been a problem in that defects attributed to the inclusions or the like are generated and the manufacturing yield is significantly decreased. Particularly, since Mg is an active element, in the above-described Cu—Mg alloy, there has been a tendency that an inclusion attributed to Mg is likely to be generated, and there has been a problem in that defects are likely to be generated during working.

The present invention has been made in consideration of the above-described circumstances, and an object of the present invention is to provide a copper alloy for electronic and electrical devices which has excellent mechanical properties and is capable of suppressing the generation of defects even in a case in which the copper alloy is worked to a thin plate thickness or a smaller wire diameter than in the related art, a plastically-worked copper alloy material, and a component and a terminal for electronic and electrical devices.

SUMMARY OF THE INVENTION

Solution to Problem

In order to solve the above-described problems, a copper alloy for electronic and electrical devices of the present invention includes Mg in a range of 1.3 mass % to 2.8 mass % with a remainder substantially being Cu and inevitable impurities, in which a content of H is set to 10 mass ppm or lower, a content of O is set to 100 mass ppm or lower, a content of S is set to 50 mass ppm or lower, and a content of C is set to 10 mass ppm or lower.

In the copper alloy for electronic and electrical devices having the above-described constitution, since the content of O is set to 100 mass ppm or lower and the content of S is set to 50 mass ppm or lower, it is possible to reduce an inclusion made of a Mg oxide, a Mg sulfide, or the like and to suppress generation of defects during working. In addition, it is possible to prevent Mg from being consumed due to a reaction with O and S and to suppress deterioration of mechanical properties.

In addition, since the content of H is set to 10 mass ppm or lower, it is possible to suppress generation of blowhole defects in an ingot and to suppress generation of defects during working.

Furthermore, since the content of C is set to 10 mass ppm or lower, it is possible to ensure cold workability and to suppress generation of defects during working.

Here, in the copper alloy for electronic and electrical devices of the present invention, it is preferable that in a scanning electron microscopic observation, the average number of intermetallic compounds which have a particle diameter of 0.1 μm or larger and include Cu and Mg as major components is preferably set to 1 compound/μm$^2$ or less.

In this case, as illustrated in the phase diagram of FIG. 1, since Mg is included in a range of 1.3 mass % to 2.8 mass % (3.3 atomic % to 6.9 atomic %) which is above the solid solubility limit, and, in a scanning electron microscopic observation, the average number of the intermetallic compounds which have a particle diameter of 0.1 μm or larger and include Cu and Mg as major components is set to 1 compound/μm$^2$ or less, precipitation of the intermetallic compound including Cu and Mg as major components is suppressed, and a Cu—Mg supersaturated solid solution in which Mg dissolves in the matrix in a supersaturated manner is formed.

Meanwhile, the average number of the intermetallic compounds which have a particle diameter of 0.1 μm or larger and include Cu and Mg as major components is computed by observing ten views of approximately 4.8 μm$^2$ using a field-emission scanning electron microscope at a magnification of 50,000 times.

In addition, the particle diameter of the intermetallic compound including Cu and Mg as major components is defined as an average value of the long diameter (the length of a straight line drawn to be the longest in a grain under a condition in which the straight line does not come into contact with a grain boundary in the middle) and the short diameter (the length of a straight line drawn to be the longest in a direction intersecting the long diameter at a right angle under a condition in which the straight line does not come into contact with a grain boundary in the middle) of the intermetallic compound.

In a copper alloy made of the above-described Cu—Mg supersaturated solid solution, there are not many coarse intermetallic compounds, which serve as starting points of cracking and contain Cu and Mg as major components, dispersed in the matrix. Thus, bendability of the copper alloy improves, making it possible to shape a component for electronic and electrical devices, such as a terminal such as a connector, a relay, and a lead frame, having a complicated shape.

Furthermore, since Mg dissolves in a supersaturated manner, it becomes possible to improve strength by means of work hardening.

In addition, in the copper alloy for electronic and electrical devices of the present invention, in a case where the content of Mg is defined as A atomic %, the conductivity σ (% IACS) is preferably in a range of $$\sigma \le 1.7241/(-0.0347 \times A^2 + 0.6569 \times A + 1.7) \times 100.$$

In this case, as illustrated in the phase diagram of FIG. 1, since Mg is included in a range of the solid solubility limit+1.3 mass % to the solid solubility limit+2.8 mass % (3.3 atomic % to 6.9 atomic %), and the conductivity is set in the above-described range, a Cu—Mg supersaturated solid solution in which Mg dissolves in the matrix in a supersaturated manner is formed.

Therefore, as described above, there are not many coarse intermetallic compounds, which serve as staring points of cracking; and include Cu and Mg as major components, dispersed in the matrix, and bendability of the alloy is improved. As a result, it becomes possible to shape a component for electronic and electrical devices, such as a terminal such as a connector, a relay, and a lead frame, having a complicated shape.

Furthermore, since Mg is dissolved in a supersaturated manner, it becomes possible to improve strength by means of work hardening.

Meanwhile, the atomic % of Mg may be computed on the assumption that the copper alloy is made up of only Cu, Mg, and other elements, ignoring an inevitable impurity element.

In addition, the copper alloy for electronic and electrical devices of the present invention may include one or more of Sn, Zn, Al, Ni, Si, Mn, Li, Ti, Fe, Co, Cr, Zr, and P in a range of 0.01 mass % to 3.0 mass % in total.

Since these elements have an effect of improving the characteristics, such as strength, of a Cu—Mg alloy, the elements are preferably added in an appropriate manner in accordance with required characteristics. Here, when the total amount of the above-described elements added is smaller than 0.01 mass %, the above-described effect of improving strength cannot be sufficiently obtained. On the other hand, when the total amount of the above-described elements added is greater than 3.0 mass %, the conductivity significantly decreases. Therefore, in the present invention, the total amount of the above-described elements added is set in a range of 0.01 mass % to 3.0 mass %.

Furthermore, the copper alloy for electronic and electrical devices of the present invention preferably has mechanical properties such that the 0.2% yield strength is 400 MPa or higher.

In a case in which the 0.2% yield strength is 400 MPa or higher, the copper alloy does not easily plastically deform and is thus particularly suitable for a terminal such as a connector, a relay, and a lead frame.

In addition, in the copper alloy for electronic and electrical devices of the present invention, it is preferable that R{220} is 0.9 or lower, wherein an X-ray diffraction intensity from a {111} plane on a plate surface is represented by I{111}, an X-ray diffraction intensity from a {200} plane on the plate surface is represented by I{200}, an X-ray diffraction intensity from a {220} plane on the plate surface is represented by I{220}, an X-ray diffraction intensity from a {311} plane on the plate surface is represented by I{311}, and a fraction R{220} of the X-ray diffraction intensity from the {220} plane on the plate surface is R{220}=I{220}/(I{111}+I{200}+I{220}+I{311}).

In this case, since the fraction R{220} of the X-ray diffraction intensity from the {220} plane on the plate surface is 0.9 or lower, presence of the {220} plane on the plate surface is suppressed. The {220} plane is easily formed by means of rolling, and, when the ratio of the {220} plane becomes high, bendability significantly degrades when a bending axis is set parallel to a rolling direction. Therefore, when the fraction R{220} of the X-ray diffraction intensity from the {220} plane on the plate surface is suppressed at 0.9 or lower, it is possible to ensure bendability and to improve the proof stress-bending balance.

Meanwhile, in the above-described copper alloy for electronic and electrical devices, R{220} is preferably set in a range of 0.3 to 0.9.

Furthermore, in the copper alloy for electronic and electrical devices of the present invention, a yield ratio YS/TS, which is calculated from a strength TS and a 0.2% yield strength YS obtained in a tensile test carried out in a direction parallel to a rolling direction, preferably exceeds 90%.

In this case, since the yield ratio YS/TS, which is calculated from the strength TS and the 0.2% yield strength YS obtained in a tensile test carried out in a direction parallel to a rolling direction, preferably exceeds 90%, the 0.2% yield strength YS becomes relatively high with respect to the strength TS. Therefore, the proof stress-bending balance improves, and bendability in a direction parallel to a rolling direction becomes excellent. Therefore, even in a case in which a copper alloy rolled plate is metal-formed into a complicated shape by being bent in a direction parallel to a rolling direction like a relay or a large-sized terminal, it is possible to suppress generation of cracking or the like.

In the copper alloy for electronic and electrical devices described above, the average crystal grain size is preferably set to 50 μm or smaller.

A relationship between the crystal grain size and the yield ratio YS/TS was investigated, and consequently, it was clarified that the yield ratio YS/TS can be improved by decreasing the crystal grain size. In addition, in a Cu—Mg-based alloy of the present invention, when the average crystal grain size is suppressed at 50 μm or smaller, it is possible to significantly improve the above-described yield ratio and make the yield ratio exceed 90%.

A plastically-worked copper alloy material for electronic and electrical devices of the present invention is formed by plastically working a copper material made of the above-described copper alloy for electronic and electrical devices. Meanwhile, in the present specification, a plastically-worked material refers to a copper alloy subjected to plastic working in any manufacturing step.

Since a plastically-worked copper alloy material having the above-described constitution is made of a copper alloy for electronic and electrical devices having excellent mechanical properties as described above, the plastically-worked copper alloy material is particularly suitable as a material for components for electronic and electrical devices.

Here, the plastically-worked copper alloy material for electronic and electrical devices of the present invention is preferably metal-formed by a manufacturing method including a heat treatment step of heating the copper material to a temperature in a range of 400° C. to 900° C. and cooling the heated copper material to 200° C. or lower at a cooling rate of 60° C./min or greater and a plastic working step of plastically working the copper material.

In this case, when the copper material having the above-described composition is heated to a temperature in a range of 400° C. to 900° C., it is possible to dissolve Mg in the copper material. In addition, when the heated copper material is cooled to 200° C. or lower at a cooling rate of 60° C./min or greater, it is possible to suppress precipitation of an intermetallic compound in the cooling step, and it becomes possible to turn the copper material into a Cu—Mg supersaturated solid solution. Therefore, there are not many coarse intermetallic compounds, which include Cu and Mg as major components, dispersed in the matrix, and bendability improves.

In addition, in the plastically-worked copper alloy material for electronic and electrical devices of the present invention, Sn plating may be carried out on a surface of the plastically-worked copper alloy material for electronic and electrical devices.

A component for electronic and electrical devices of the present invention is made of the above-described plastically-worked copper alloy material for electronic and electrical devices. Meanwhile, in the present invention, examples of the component for electronic and electrical devices include a terminal such as a connector, a relay, a lead frame, and the like.

In addition, a terminal of the present invention is made of the above-described plastically-worked copper alloy material for electronic and electrical devices.

Since the component and the terminal for electronic and electrical devices having the above-described constitution is manufactured using a plastically-worked copper alloy material for electronic and electrical devices having excellent mechanical properties, even when the component and the terminal have a complicated shape, cracking or the like does not occur, and reliability improves.

Advantageous Effects of Invention

According to the present invention, it is possible to provide a copper alloy for electronic and electrical devices which has excellent mechanical properties and is capable of suppressing generation of defects even in a case in which the copper alloy is worked to a thin plate thickness or a smaller wire diameter than in the related art, a plastically-worked copper alloy material, and a component and a terminal for electronic and electrical devices.

DETAILED DESCRIPTION OF THE INVENTION

Figure 1:
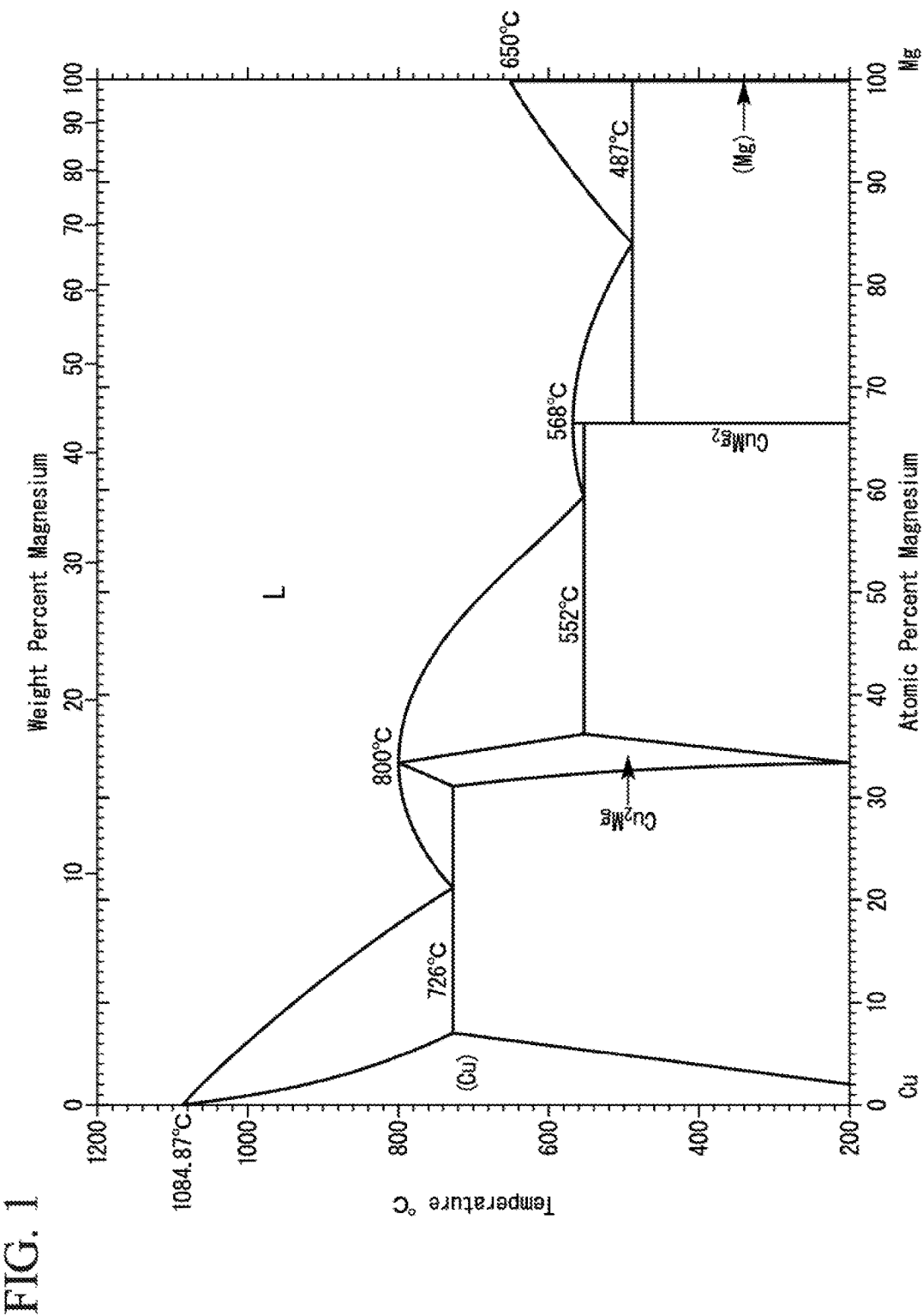
FIG. 1 is a phase diagram of a Cu—Mg system.

Hereinafter, embodiments of the present invention will be described with reference to the accompanying drawings.

First Embodiment

The component composition of a copper alloy for electronic and electrical devices of the present embodiment includes Mg in a range of 1.3 mass % to 2.8 mass % with a remainder substantially being Cu and inevitable impurities, and thus the copper alloy forms a so-called 2-membered alloy of Cu and Mg.

In addition, in the copper alloy for electronic and electrical devices of the present embodiment, the 0.2% yield strength is set to 400 MPa or higher.

Here, when the content of Mg is defined as A atomic %, the conductivity σ (% IACS) is in a range of $\sigma \leq 1.7241/(-0.0347 \times A^2 + 0.6569 \times A + 1.7) \times 100$.

In addition, in a scanning electron microscopic observation, the average number of intermetallic compounds which have a particle diameter of 0.1 μm or larger and include Cu and Mg as major components is set to 1 compound/μm$^2$ or less.

That is, in the copper alloy for electronic and electrical devices of the present embodiment, the intermetallic compound which includes Cu and Mg as major components is rarely precipitated, and a Cu—Mg supersaturated solid solution in which Mg dissolves in the matrix beyond the solid solution limit is formed.

In addition, in the copper alloy for electronic and electrical devices of the present embodiment, the contents of H, O, S, and C, which are impurity elements, are specified as described below.

H: 10 mass ppm or lower
O: 100 mass ppm or lower
S: 50 mass ppm or lower
C: 10 mass ppm or lower Here, the reasons for regulating the component composition, the conductivity, and the number of precipitates as described above will be described.

(Mg: In a Range of 1.3 Mass % to 2.8 Mass %)

Mg is an element having an effect of improving strength and increasing the recrystallization temperature while not significantly degrading conductivity. In addition, when Mg is dissolved in the matrix, excellent bendability is obtained.

Here, when the content of Mg is lower than 1.3 mass %, it is not possible to make the effect exhibited. On the other hand, when the content of Mg exceeds 2.8 mass %, the intermetallic compound including Cu and Mg as major components remains when a thermal treatment is carried out in order to form a solid solution, and there is a concern that cracking may occur during the subsequent hot working and cold working. For these reasons, the content of Mg is set in a range of 1.3 mass % to 2.8 mass % (3.3 atomic % to 6.9 atomic %).

Meanwhile, when the content of Mg is low, strength does not sufficiently improve. In addition, since Mg is an active element, when excessively added, there is a concern that, during melting and casting, Mg may react with oxygen and thus a generated Mg oxide may be mixed into the copper alloy. Therefore, the content of Mg is more preferably set in a range of 1.4 mass % to 2.6 mass % (3.6 atomic % to 6.5 atomic %).

Here, regarding the above-described composition values in atomic %, in the present embodiment, since the copper alloy is a 2-membered alloy of Cu and Mg, the composition values are calculated from values in mass % on the assumption that the copper alloy is made up of only Cu and Mg, ignoring an inevitable impurity element.

(H (Hydrogen): 10 Mass Ppm or Lower)

H is an element that is connected to O during casting and thus turns into vapor and generates blowhole defects in an ingot. This blowhole defects cause defects such as cracking during casting and swelling, peeling, and the like during rolling. These defects of cracking, swelling, and peeling concentrate stress and serve as a starting point for fracture, and thus it is known that H deteriorates strength and stress corrosion cracking resistance. Here, when the content of H exceeds 10 mass ppm, the above-described blowhole defects are easily generated.

Therefore, in the present embodiment, the content of H is regulated to be 10 mass ppm or lower. Meanwhile, in order to further suppress generation of the blowhole defects, the content of H is preferably set to 4 mass ppm or lower and more preferably 2 mass ppm or lower. When the obtained effects of the copper alloy for electronic and electrical devices described above are taken into account, a preferred lower limit of the content of H is 0.01 mass ppm, but is not limited thereto.

(O (Oxygen): 100 Mass Ppm or Lower)

O is an element that reacts with individual component elements in the copper alloy and thus forms an oxide. This oxide serves as a starting point of fracture, and thus cold rolling properties degrade, and furthermore, bendability also deteriorates. In addition, in a case in which the content of O exceeds 100 mass ppm, O reacts with Mg and thus consumes Mg, the amount of Mg dissolved in the matrix of Cu decreases, and there is a concern that mechanical properties may deteriorate.

Therefore, in the present embodiment, the content of O is regulated to be 100 mass ppm or lower. Meanwhile, within the above-described range, the content of O is preferably, particularly, 50 mass ppm or lower and more preferably 20 mass ppm or lower. When the obtained effects of the copper alloy for electronic and electrical devices described above are taken into account, a preferred lower limit of the content of O is 0.01 mass ppm, but is not limited thereto.

(S (Sulfur): 50 Mass Ppm or Lower)

S is an element that is present in a crystal grain boundary in a form of an intermetallic compound or a complex sulfide. The intermetallic compound or complex sulfide present in a grain boundary causes grain boundary cracking during hot working and generates working cracks. In addition, since these cracks serve as starting points for fracture, cold rolling properties or bendability deteriorates. Furthermore, S reacts with Mg and thus consumes Mg, the amount of Mg dissolved in the matrix of Cu decreases, and there is a concern that mechanical properties may deteriorate.

Therefore, in the present embodiment, the content of S is regulated to be 50 mass ppm or lower. Meanwhile, within the above-described range, the content of S is preferably, particularly, 40 mass ppm or lower and more preferably 30 mass ppm or lower. When the obtained effects of the copper alloy for electronic and electrical devices described above are taken into account, a preferred lower limit of the content of S is 0.01 mass ppm, but is not limited thereto.

(C (Carbon): 10 Mass Ppm or Lower)

C is used to cover the surface of molten metal during melting and casting in order for a deoxidization action of the molten metal and is an element for which there is a concern of inevitable interfusion. When the content of C exceeds 10 mass ppm, a large amount of C is mixed into the copper alloy during casting. Segregation of this C, a complex carbide, or a solid solution of C deteriorates cold rolling properties.

Therefore, in the present embodiment, the content of C is regulated to be 10 mass ppm or lower. Meanwhile, within the above-described range, the content of C is preferably 5 mass ppm or lower and more preferably 1 mass ppm or lower.

Examples of other inevitable impurities include Ag, B, Ca, Sr, Ba, Sc, Y, rare-earth elements, Hf, V, Nb, Ta, Mo, W, Re, Ru, Os, Se, Te, Rh, Ir, Pd, Pt, Au, Cd, Ga, In, Ge, As, Sb, Tl, Pb, Bi, Be, N, Hg, and the like. The total amount of these inevitable impurities is desirably 0.3 mass % or lower.

(Conductivity (% IACS))

In a 2-membered alloy of Cu and Mg, when the content of Mg is defined as A atomic %, in a case in which the conductivity $\sigma$ (% IACS) is in a range of $\sigma \leq 1.7241/(-0.0347 \times A^2 + 0.6569 \times A + 1.7) \times 100$, an intermetallic compound is rarely present.

That is, in a case in which the conductivity $\sigma$ (% IACS) exceeds the above-described expression, a large amount of an intermetallic compound is present, and the size thereof is also relatively large, and thus bendability significantly deteriorates. Therefore, manufacturing conditions are adjusted so that the conductivity $\sigma$ (% IACS) falls into the range of the above-described expression.

Meanwhile, in order to make the above-described effects reliably exhibited, the conductivity $\sigma$ (% IACS) is preferably set in a range of $\sigma \leq 1.7241/(-0.0292 \times A^2 + 0.6797 \times A + 1.7) \times 100$. In this case, the amount of an intermetallic compound including Cu and Mg as major components becomes smaller, and thus bendability further improves.

(Precipitate)

In the copper alloy for electronic and electrical devices of the present embodiment, as a result of observing the copper alloy using a scanning electron microscope, it is found that the average number of intermetallic compounds which have a particle diameter of 0.1 µm or larger and include Cu and Mg as major components is set to 1 compound/µm$^2$ or less. That is, the intermetallic compound including Cu and Mg as major components is rarely precipitated, and Mg dissolves in the matrix.

Here, when formation of a solid solution is incomplete, or an intermetallic compound including Cu and Mg as major components is precipitated after formation of a solid solution, and thus a large amount of a large-sized intermetallic compound is present, this intermetallic compound serves as a starting point for cracking, and bendability significantly deteriorates.

As a result of investigating the structure of the copper alloy, it is found that, in a case in which the average number of intermetallic compounds which have a particle diameter of 0.1 µm or larger and include Cu and Mg as major components is 1 compound/µm$^2$ or less, that is, the intermetallic compound including Cu and Mg as major components is not present or slightly present, favorable bendability is obtained.

Furthermore, in order to make the above-described effect reliably exhibited, the average number of intermetallic compounds which have a particle diameter of 0.05 µm or larger and include Cu and Mg as major components is more preferably set to 1 compound/µm$^2$ or less in the alloy.

Meanwhile, the average number of the intermetallic compounds including Cu and Mg as major components is computed by observing ten views of approximately 4.8 µm$^2$ using a field-emission scanning electron microscope at a magnification of 50,000 times.

In addition, the particle diameter of the intermetallic compound including Cu and Mg as major components is defined as an average value of the long diameter (the length of a straight line drawn to be the longest in a grain under a condition in which the straight line does not come into contact with a grain boundary in the middle) and the short diameter (the length of a straight line drawn to be the longest in a direction intersecting the long diameter at a right angle under a condition in which the straight line does not come into contact with a grain boundary in the middle) of the intermetallic compound.

Here, the intermetallic compound including Cu and Mg as major components has a crystal structure represented by a chemical formula of MgCu$_2$, a prototype MgCu$_2$, a Pearson symbol of cF24, and a space group number of Fd-3m.

Next, a method for manufacturing a copper alloy for electronic and electrical devices of the present embodiment having the above-described constitution and a method for manufacturing a plastically-worked copper alloy material for electronic and electrical devices will be described with reference to the flowchart in FIG. 2.

(Melt Casting Step S01)

First, components are adjusted by adding the above-described elements to molten copper obtained by melting a copper raw material, thereby producing a molten copper alloy. Meanwhile, as the Mg added, it is possible to use a Mg single body, a Cu—Mg parent alloy, or the like. In addition, a raw material including Mg may be melted together with the copper raw material. In addition, a recycled material or a scrapped material of the present alloy may also be used.

Here, the molten copper is preferably a so-called 4NCu having a purity set to 99.99% by mass or higher. Particularly, in the present embodiment, since the contents of H, O, S, and C are regulated as described above, a raw material in which the contents of these elements are small is selected and used. In addition, in the melting step, it is preferable to use a vacuum furnace or an atmosphere furnace set to an inert gas atmosphere or a reducing atmosphere in order to suppress oxidization of Mg.

In addition, the molten copper alloy having the adjusted components is injected into a casting mold, thereby producing an ingot. Meanwhile, in a case in which mass production is taken into account, a continuous casting method or a semi-continuous casting method is preferably used.

(Homogenization/Solution Treatment Step S02)

Next, a heating treatment is carried out in order for homogenization of the obtained ingot and formation of a solid solution. Inside the ingot, an intermetallic compound including Cu and Mg as major components which is generated by Mg being condensed due to segregation in a solidification step is present. Therefore, in order to remove or reduce the segregation and the intermetallic compound, a heating treatment in which the ingot is heated to a temperature in a range of 400° C. to 900° C. is carried out, thereby homogeneously dispersing Mg or dissolving Mg in the matrix in the ingot. Meanwhile, this homogenization/solution treatment step S02 is preferably carried out in a non-oxidizing or reducing atmosphere. In addition, a copper material heated to a temperature in a range of 400° C. to 900° C. is cooled to a temperature of 200° C. or lower at a cooling rate of 60° C./min or higher.

Here, when the heating temperature is lower than 400° C., formation of a solid solution becomes incomplete, and there is a concern that a large amount of an intermetallic compound including Cu and Mg as major components may remain in the matrix. On the other hand, when the heating temperature exceeds 900° C., some of the copper material turns into a liquid phase, and there is a concern that the structure or the surface state may become uneven. Therefore, the heating temperature is set in a range of 400° C. to 900° C., more preferably set in a range of 500° C. to 850° C., and still more preferably set in a range of 520° C. to 800° C.

(Hot Working Step S03)

In order to increase the efficiency of rough working and homogenize the structure, hot working may be carried out. The temperature condition in the hot working step S03 is not particularly limited, but the temperature is preferably set in a range of 400° C. to 900° C. In addition, regarding a cooling method after working, the ingot is preferably cooled to 200° C. or lower at a cooling rate of 60° C./min or higher as cooled in water quenching. Furthermore, a working method is not particularly limited, and examples of the method that can be employed include rolling, wire drawing, extrusion, groove rolling, forging, pressing, and the like.

(Intermediate Working Step S04)

Next, the copper material is cut as necessary, and surface grinding is carried out as necessary in order to remove an oxidized film or the like generated on the surface of the copper material. In addition, the copper material is plastically-worked to a predetermined shape.

Meanwhile, the temperature condition in the intermediate working step S04 is not particularly limited, but is preferably set in a range of −200° C. to 200° C. in which cold or warm working is carried out. In addition, the processing rate is appropriately selected so that the copper alloy approximates to a final shape; however, in order to reduce the number of times of an intermediate heat treatment step S05 required until the final shape is obtained, the processing rate is preferably set to 20% or higher. In addition, the processing rate is more preferably set to 30% or higher. A plastic working method is not particularly limited, and examples of the plastic working method that can be employed include rolling, wire drawing, extrusion, groove rolling, forging, pressing, and the like. When the obtainable effects of the plastically-worked copper alloy material for electronic and electrical devices described above are taken into account, a preferred upper limit value of the processing rate is 99%, but is not limited thereto.

(Intermediate Heat Treatment Step S05)

After the intermediate working step S04, a thermal treatment is carried out for softening, which aims to reliably form a solid solution, form a recrystallized structure or improve working properties.

A method for the thermal treatment is not particularly limited; however, preferably, the thermal treatment is carried out under a condition of 400° C. to 900° C. in a non-oxidizing atmosphere or a reducing atmosphere. The condition is more preferably in a range of 400° C. to 850° C. and still more preferably in a range of 520° C. to 800° C.

Meanwhile, the intermediate working step S04 and the intermediate heat treatment step S05 may be repeatedly carried out.

Here, in the intermediate heat treatment step S05, the copper material heated to a temperature in a range of 400° C. to 900° C. is preferably cooled to a temperature of 200° C. or lower at a cooling rate of 60° C./min. When the copper material is quenched as described above, precipitation of Mg dissolved in the matrix as an intermetallic compound including Cu and Mg as major components is suppressed, and it is possible to turn the copper material into a Cu—Mg supersaturated solid solution.

(Finish Working Step S06)

The copper material which has been subjected to the intermediate heat treatment step S05 is finish-worked to a predetermined shape. Meanwhile, the temperature condition in the finish working step S06 is not particularly limited, but the finish working step is preferably carried out at normal temperature. In addition, the processing rate is appropriately selected so that the copper alloy approximates to a final shape; however, in order to improve strength by means of work hardening, the processing rate is preferably set to 20% or higher. In addition, in a case in which additional improvement in strength is required, the processing rate is more preferably set to 30% or higher. Here, a working method is not particularly limited, and it is possible to employ, for example, rolling in a case in which the final shape is a plate or a strip, wire drawing, extrusion, groove rolling, or the like in the case of a wire or a rod, and forging or pressing in the case of a bulk shape.

(Finish Heat Treatment Step S07)

Next, a finish thermal treatment is carried out on the plastically-worked material obtained using the finish working step S06.

The thermal treatment temperature is preferably set in a range of 100° C. to 800° C. Meanwhile, in the finish heat treatment step S07, it is necessary to set thermal treatment conditions (temperature, time, and cooling rate) so as to prevent dissolved Mg from being precipitated. For example, the thermal treatment conditions are preferably set to approximately 1 minute to 24 hours at 200° C. and approximately 1 second to 5 seconds at 800° C. This thermal treatment is preferably carried out in a non-oxidizing atmosphere or a reducing atmosphere.

In addition, regarding a cooling method, the heated copper material is preferably cooled to 100° C. or lower at a cooling rate of 60° C./min or higher as in water quenching. When the copper material is quenched as described above, precipitation of Mg dissolved in the matrix as an intermetallic compound including Cu and Mg as major components is suppressed, and it is possible to turn the copper material into a Cu—Mg supersaturated solid solution.

Furthermore, the above-described finish working step S06 and the finish thermal treatment S07 may be repeatedly carried out. When the obtained effects of the plastically-worked copper alloy material for electronic and electrical devices are taken into account, a preferred lower limit of the cooling temperature is 0° C., but is not limited thereto.

The copper alloy for electronic and electrical devices and the plastically-worked copper alloy material for electronic and electrical devices which are the present embodiments are produced in the above-described manner. Meanwhile, a Sn plate may be formed on the surface of the plastically-worked copper alloy material for electronic and electrical devices.

In addition, a component and a terminal for electronic and electrical devices which are the present embodiments are manufactured by carrying out punching working, bending working, or the like on the above-described plastically-worked copper alloy material for electronic and electrical devices.

According to the copper alloy for electronic and electrical devices of the present embodiment having the above-described constitution, since the content of O is set to 100 mass ppm or lower, and the content of S is set to 50 mass ppm or lower, it is possible to reduce the amount of an inclusion made of a Mg oxide, a Mg sulfide, or the like and to suppress generation of defects during working. In addition, it is possible to prevent Mg from being consumed due to a reaction with O and S and to suppress deterioration of mechanical properties.

In addition, since the content of H is set to 10 mass ppm or lower, it is possible to suppress generation of blowhole defects in the ingot and to suppress generation of defects during working.

Furthermore, since the content of C is set to 10 mass ppm or lower, it is possible to ensure cold workability and to suppress generation of defects during working.

In addition, in the copper alloy for electronic and electrical devices of the present embodiment, the average number of intermetallic compounds which have a particle diameter of 0.1 μm or larger and include Cu and Mg as major components is set to 1 compound/μm$^2$ or less in a scanning electron microscopic observation, when the content of Mg is defined as A atomic %, the conductivity σ (% IACS) is set in a range of $\sigma \leq 1.7241/(-0.0347 \times A^2 + 0.6569 \times A + 1.7) \times 100$, and a Cu—Mg supersaturated solid solution in which Mg dissolves in the matrix in a supersaturated manner is formed.

Therefore, there are not many coarse intermetallic compounds, which serve as starting points for cracking and include Cu and Mg as major components, dispersed in the matrix, and bendability improves. Therefore, it becomes possible to shape a component for electronic and electrical devices, such as a terminal such as a connector, a relay, and a lead frame, having a complicated shape. Furthermore, since Mg is dissolved in a supersaturated manner, it becomes possible to improve strength by means of work hardening.

In the present embodiment, since the copper alloy for electronic and electrical devices is manufactured using the manufacturing method including the homogenization/solution treatment step S02, the intermediate heat treatment step S05, and the finish heat treatment step S07 in which the copper material having the above-described composition is heated to a temperature in a range of 400° C. to 900° C. and the heated copper material is cooled to 200° C. or lower at a cooling rate of 60° C./min or greater, and the intermediate working step S04 and the finish working step S06 in which the copper material is plastically-worked, it is possible to turn the copper alloy for electronic and electrical devices into a Cu—Mg supersaturated solid solution in which Mg dissolves in the matrix in a supersaturated manner as described above.

In addition, since the component and the terminal for electronic and electrical devices which are the present embodiments are manufactured using the above-described plastically-worked copper alloy material for electronic and electrical devices, the proof stress is high, bendability is excellent, cracking or the like does not occur in a component and a terminal having a complicated shape, and reliability improves.

Second Embodiment

Next, a copper alloy for electronic and electrical devices of a second embodiment of the present invention will be described.

The component composition of the copper alloy for electronic and electrical devices of the present embodiment includes Mg in a range of 1.3 mass % to 2.8 mass % with a remainder substantially being Cu and inevitable impurities, and thus the copper alloy forms a so-called 2-membered alloy of Cu and Mg.

In addition, in the copper alloy for electronic and electrical devices of the present embodiment, the contents of H, O, S, and C, which are impurity elements, are specified as described below.

H: 10 mass ppm or lower
O: 100 mass ppm or lower
S: 50 mass ppm or lower
C: 10 mass ppm or lower In addition, in the copper alloy for electronic and electrical devices of the present embodiment, R{220} is 0.9 or lower, wherein an X-ray diffraction intensity from a {111} plane on a plate surface is represented by I{111}, an X-ray diffraction intensity from a {200} plane on the plate surface is represented by I{200}, an X-ray diffraction intensity from a {220} plane on the plate surface is represented by I{220}, an X-ray diffraction intensity from a {311} plane on the plate surface is represented by I{311}, and a fraction R{220} of the X-ray diffraction intensity from the {220} plane on the plate surface is R{220}=I{220}/(I{111}+I{200}+I{220}+I{311}).

The {220} plane on the plate surface is formed of a rolled texture, and, when the ratio of the {220} plane becomes high, in a case in which bending working is carried out so that the bending axis becomes parallel to a rolling direction, an orientation relationship in which a slip system does not easily work with respect to a stress direction of the bending working is established. In such a case, deformation occurs locally during the bending working and causes cracking.

Therefore, in the present embodiment, the fraction R{220} of the X-ray diffraction intensity from the {220} plane on the plate surface is suppressed at 0.9 or lower. In addition, the fraction R{220} of the X-ray diffraction intensity from the {220} plane is, even in the above-described range, preferably 0.85 or lower and more preferably 0.8 or lower.

Meanwhile, the lower limit of the fraction R{220} of the X-ray diffraction intensity from the {220} plane is not particularly regulated, but is preferably set to 0.3 or higher and more preferably set to 0.4 or higher.

Next, a method for manufacturing a copper alloy for electronic and electrical devices of the present embodiment having the above-described constitution and a method for manufacturing a plastically-worked copper alloy material for electronic and electrical devices will be described with reference to the flowchart in FIG. 3.

Figure 2:
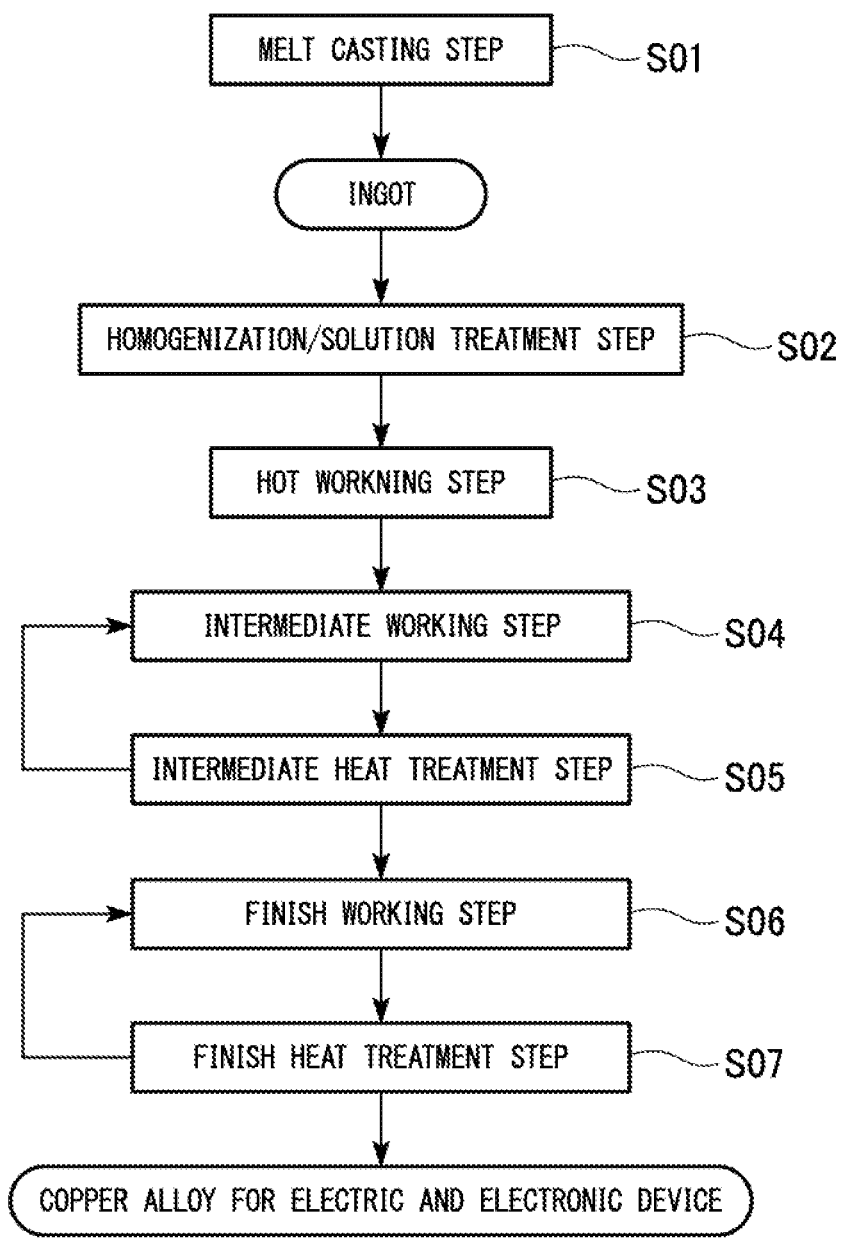
FIG. 2 is a flowchart of a method for manufacturing a copper alloy for electronic and electrical devices according to a first embodiment of the present invention.
Figure 3:
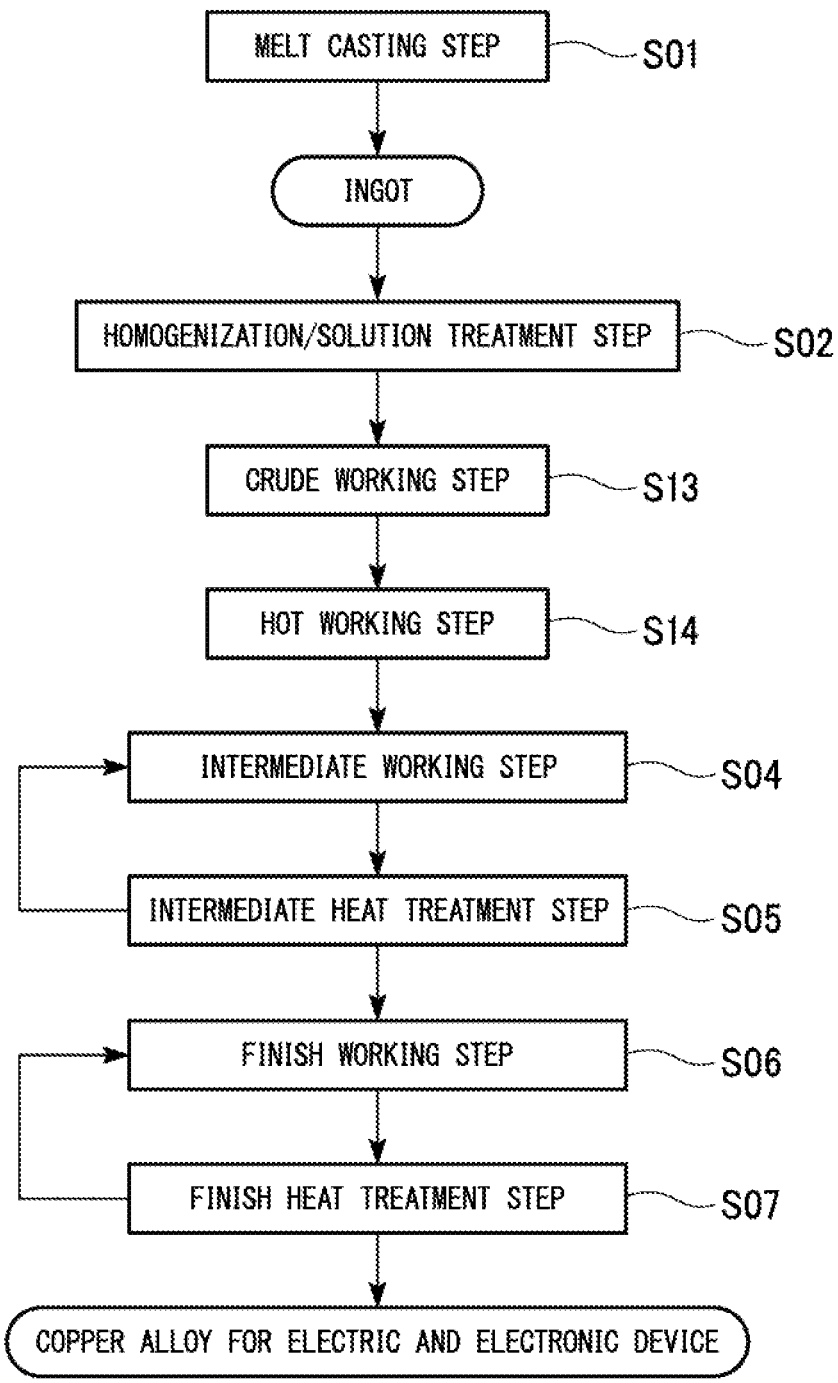
FIG. 3 is a flowchart of a method for manufacturing a copper alloy for electronic and electrical devices according to a second embodiment of the present invention.

In the present embodiment, as illustrated in FIG. 3, the method includes the melt casting step S01, the homogenization/solution treatment step S02, a rough working step S13, a heat treatment step S14, the intermediate working step S04, the intermediate heat treatment step S05, the finish working step S06, and the finish heat treatment step S07, and, in the method for manufacturing a copper alloy for electronic and electrical devices in the first embodiment, which is illustrated in FIG. 2, the hot working step S03 is substituted with the rough working step S13 and the heat treatment step S14. Therefore, the melt casting step S01, the homogenization/solution treatment step S02, the intermediate working step S04, the intermediate heat treatment step S05, the finish working step S06, and the finish heat treatment step S07 are the same as those in the first embodiment.

(Rough Working Step S13)

In the rough working step S13, in order to further accelerate homogenization of a cast structure, rough working is carried out on an ingot which has been subjected to the homogenization/solution treatment step S02. Meanwhile, the temperature condition in the rough working step S13 is not particularly limited; however, in order to suppress precipitation, the temperature is preferably set in a range of −200° C. to 200° C. in which cold or warm working is carried out. The processing rate is preferably 20% or higher and more preferably 30% or higher. In addition, a working method is not particularly limited, and examples of the working method that can be employed include rolling, wire drawing, extrusion, groove rolling, forging, pressing, and the like.

(Heat Treatment Step S14)

In order to reliably form a solid solution, a thermal treatment is carried out after the rough working step S13. Regarding conditions for the thermal treatment, the thermal treatment is preferably carried out at a temperature in a range of 400° C. to 900° C. in a non-oxidizing atmosphere or a reducing atmosphere.

In addition, regarding a cooling method, the heated copper material is preferably cooled to 200° C. or lower at a cooling rate of 60° C./min or higher as in water quenching.

The copper alloy for electronic and electrical devices and the above-described plastically-worked copper alloy material for electronic and electrical devices which are the present embodiments are produced in the above-described manner.

In addition, a component and a terminal for electronic and electrical devices which are the present embodiments are manufactured by carrying out punching working, bending working, or the like on the plastically-worked copper alloy material for electronic and electrical devices.

According to the copper alloy for electronic and electrical devices of the present embodiment having the above-described constitution, it becomes possible to exhibit the same effects as those of the first embodiment.

In addition, in the present embodiment, since the fraction R{220} of the X-ray diffraction intensity from the {220} plane on the plate surface is suppressed at 0.9 or lower, even in a case in which the ratio of the {220} plane, which is a rolled texture, is small and bending working is carried out so that the bending axis becomes parallel to a rolling direction, it is possible to suppress the occurrence of cracking. Therefore, it is possible to improve bendability while maintaining proof stress, and it becomes possible to significantly improve the proof-bending balance.

Third Embodiment

Next, a copper alloy for electronic and electrical devices of a third embodiment of the present invention will be described.

The component composition of the copper alloy for electronic and electrical devices of the present embodiment includes Mg in a range of 1.3 mass % to 2.8 mass % with a remainder substantially being Cu and inevitable impurities, and thus the copper alloy forms a so-called 2-membered alloy of Cu and Mg.

In addition, in the copper alloy for electronic and electrical devices of the present embodiment, the contents of H, O, S, and C, which are impurity elements, are specified as described below.

H: 10 mass ppm or lower
O: 100 mass ppm or lower
S: 50 mass ppm or lower
C: 10 mass ppm or lower In addition, in the copper alloy for electronic and electrical devices of the present embodiment, a yield ratio YS/TS, which is calculated from a strength TS and a 0.2% yield strength YS obtained in a tensile test carried out in a direction parallel to a rolling direction, exceeds 90%.

Furthermore, in the copper alloy for electronic and electrical devices of the present embodiment, the average crystal grain size is set to 50 μm or smaller.

(Yield Ratio)

When the yield ratio YS/TS, which is calculated from the strength TS and the 0.2% yield strength YS obtained in a tensile test carried out in a direction parallel to a rolling direction, exceeds 90%, the 0.2% yield strength becomes relatively high with respect to the strength TS. Bendability is a problem of fracture and has a strong correlation with strength. Therefore, in a case in which the 0.2% yield strength is relatively high with respect to the strength, the proof stress-bending balance becomes high, and bendability becomes excellent.

Here, in order to make the above-described effects reliably exhibited, the yield ratio is preferably set to 91% or higher and more preferably 92% or higher. When the obtained effects of the copper alloy material for electronic and electrical devices described above are taken into account, a preferred upper limit value of the yield ratio is 99.8%, but is not limited thereto.

(Average Crystal Grain Size)

In the copper alloy for electronic and electrical devices of the present embodiment, the average crystal grain size is set to 50 μm or smaller. When the crystal grain size decreases, the yield ratio YS/TS improves, and thus it becomes possible to make the yield ratio YS/TS in a direction parallel to a rolling direction reliably exceed 90% by setting the average crystal grain size to 50 μm or smaller.

Meanwhile, the average crystal grain size is preferably set to 40 μm or smaller and more preferably set to 30 μm or smaller. The average crystal grain size is most desirably 10 μm or smaller. When the obtained effects of the copper alloy material for electronic and electrical devices described above are taken into account, a preferred lower limit value of the average crystal grain size is 1 μm, but is not limited thereto.

Next, a method for manufacturing a copper alloy for electronic and electrical devices of the present embodiment having the above-described constitution and a method for manufacturing a plastically-worked copper alloy material for electronic and electrical devices will be described with reference to the flowchart in FIG. 4.

Figure 4:
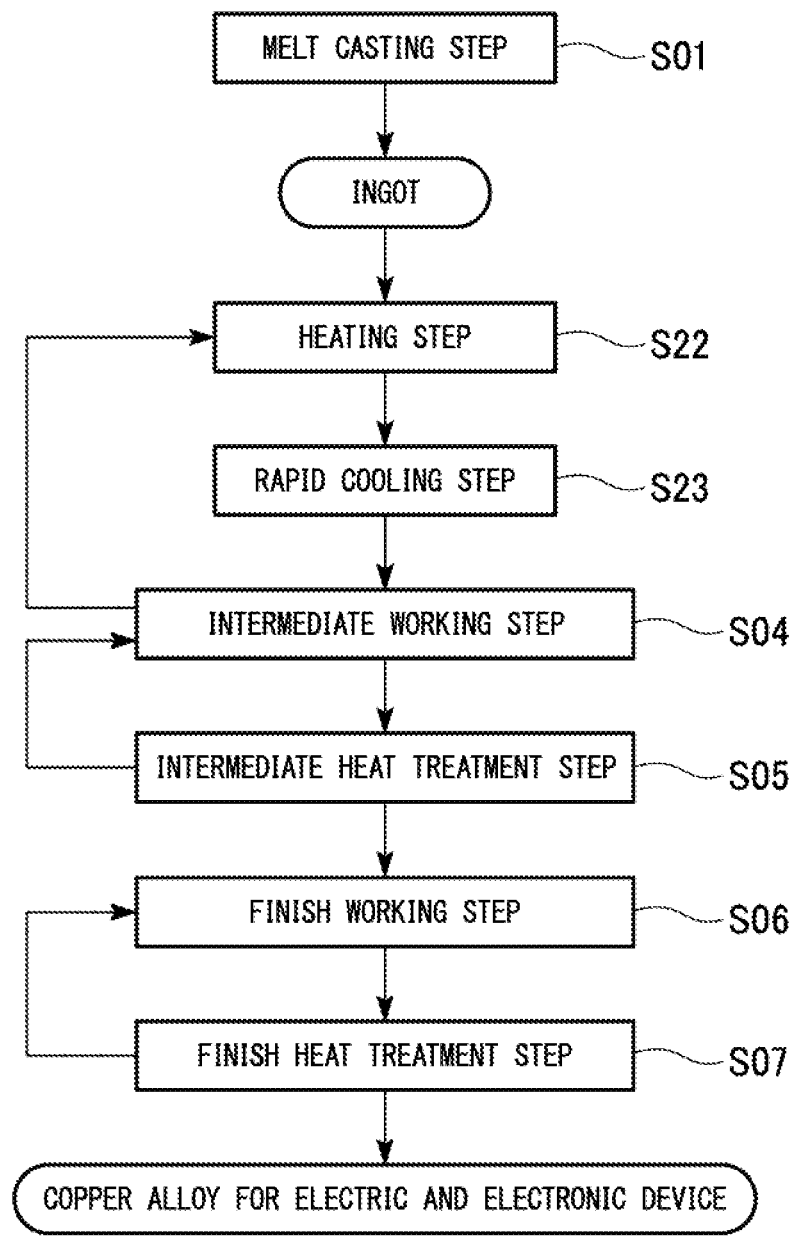
FIG. 4 is a flowchart of a method for manufacturing a copper alloy for electronic and electrical devices according to a third embodiment of the present invention.

In the present embodiment, as illustrated in FIG. 4, the method includes the melt casting step S01, a heating step S22, a rapid cooling step S23, the intermediate working step S04, the Intermediate heat treatment step S05, the finish working step S06, and the finish heat treatment step S07, and, in the method for manufacturing a copper alloy for electronic and electrical devices in the first embodiment, which is illustrated in FIG. 2, the homogenization/solution treatment step S02 and the hot working step S03 are substituted with the heating step S22 and the rapid cooling step S23. Therefore, the melt casting step S01, the intermediate working step S04, the Intermediate heat treatment step S05, the finish working step S06, and the finish heat treatment step S07 are the same as those in the first embodiment.

(Heating Step S22)

In the heating step S22, a heating treatment is carried out in order for homogenization of the obtained ingot and formation of a solid solution. Inside the ingot, an intermetallic compound including Cu and Mg as major components which is generated by Mg being condensed due to segregation in a solidification step is present. Therefore, in order to remove or reduce the segregation and the intermetallic compound, a heating treatment in which the ingot is heated to a temperature in a range of 400° C. to 900° C. is carried out, thereby homogeneously disperse Mg or dissolving Mg in the matrix in the ingot. Meanwhile, this heating step S22 is preferably carried out in a non-oxidizing or reducing atmosphere.

Here, when the heating temperature is lower than 400° C., formation of a solid solution becomes incomplete, and there is a concern that a large amount of an intermetallic compound including Cu and Mg as major components may remain in the matrix. On the other hand, when the heating temperature exceeds 900° C., some of the copper material turns into a liquid phase, and there is a concern that the structure or the surface state may become uneven. Therefore, the heating temperature is set in a range of 400° C. to 900° C., more preferably set in a range of 400° C. to 850° C., and still more preferably set in a range of 420° C. to 800° C.

(Rapid Cooling Step S23)

In the rapid cooling step S23, the copper material heated to a temperature in a range of 400° C. to 900° C. in the heating step S22 is cooled to a temperature of 200° C. or lower at a cooling rate of 60° C./min or higher.

By means of this rapid cooling step S23, precipitation of Mg dissolved in the matrix as an intermetallic compound including Cu and Mg as major components is suppressed, and it is possible to set the average number of intermetallic compounds which have a particle diameter of 0.1 μm or larger and include Cu and Mg as major components to 1 compound/μm$^2$ or less in a scanning electron microscopic observation. That is, it is possible to turn the copper material into a Cu—Mg supersaturated solid solution.

Meanwhile, in order to increase the efficiency of rough working and homogenize the structure, it is possible to carry out hot working after the above-described heating step S22 and carry out the above-described rapid cooling step S23 after the hot working. In this case, a working method is not particularly limited, and examples of the method that can be employed include rolling, wire drawing, extrusion, groove rolling, forging, pressing, and the like.

The copper alloy for electronic and electrical devices and the plastically-worked copper alloy material for electronic and electrical devices which are the present embodiments are produced in the above-described manner.

In addition, a component and a terminal for electronic and electrical devices which are the present embodiments are manufactured by carrying out punching working, bending working, or the like on the above-described plastically-worked copper alloy material for electronic and electrical devices.

According to the copper alloy for electronic and electrical devices of the present embodiment having the above-described constitution, it becomes possible to exhibit the same effects as those of the first embodiment.

In addition, in the present embodiment, since the yield ratio YS/TS, which is calculated from the strength TS and the 0.2% yield strength YS obtained in a tensile test carried out in a direction parallel to a rolling direction, is set to higher than 90%, the proof stress-bending balance becomes favorable, and bendability in a direction parallel to a rolling direction becomes excellent.

Therefore, even in a case in which a copper alloy rolled plate is bent in a direction parallel to a rolling direction of the copper alloy rolled plate as for a relay or a large-sized terminal, it is possible to suppress the occurrence of cracking.

In addition, in the copper alloy for electronic and electrical devices of the present embodiment, since the average crystal grain size is set to 50 μm or smaller, it is possible to improve the yield ratio YS/TS, and it becomes possible to make the yield ratio YS/TS in a direction parallel to a rolling direction reliably exceed 90%.

Thus far, the copper alloy for electronic and electrical devices, the plastically-worked copper alloy material for electronic and electrical devices, the component and the terminal for electronic and electrical devices, which are embodiments of the present invention, have been described, but the present invention is not limited thereto and can be appropriately modified within the scope of the technical concept of the invention.

For example, in the above-described embodiments, examples of the method for manufacturing a copper alloy for electronic and electrical devices and the method for manufacturing a plastically-worked copper alloy material for electronic and electrical devices have been described, but the manufacturing methods are not limited to the present embodiments, and the copper alloy for electronic and electrical devices and the plastically-worked copper alloy material for electronic and electrical devices may be manufactured by appropriately selecting an existing manufacturing method.

In addition, in the present embodiment, examples of the two-membered alloy of Cu—Mg have been described, but the copper alloy is not limited thereto and may include one or more of Sn, Zn, Al, Ni, Si, Mn, Li, Ti, Fe, Co, Cr, Zr, and P in a range of 0.01 mass % to 3.0 mass % in total.

Since the elements of Sn, Zn, Al, Ni, Si, Mn, Li, Ti, Fe, Co, Cr, Zr, and P are elements improving the characteristics, such as strength, of a Cu—Mg alloy, the elements are preferably added to the copper alloy in an appropriate manner in accordance with required characteristics. Here, since the total amount of those elements added is set to 0.01 mass % or greater, it is possible to reliably improve the strength of a Cu—Mg alloy. Meanwhile, since the total amount of those elements added is set to 3.0 mass % or less, it is possible to ensure conductivity.

Meanwhile, in a case in which the above-described elements are included, the regulation of the conductivity described in the embodiments is not applied, but it is possible to confirm that the copper alloy is a Cu—Mg supersaturated solid solution from the distribution state of a precipitate.

EXAMPLES

Example 1

Hereinafter, results of confirmation tests carried out in order to confirm the effects of the present invention will be described.

Selected copper having a H content of 0.1 ppm or lower, an O content of 1.0 ppm or lower, a S content of 1.0 ppm or lower, a C content of 0.3 ppm or lower, and C with a purity of 99.99% by mass or higher was prepared as a raw material, was put into a high-purity alumina crucible, and was melted in a high-purity Ar gas (with a dew point of −80° C. or lower) atmosphere using a high-frequency melting furnace. A variety of elements were added to the molten copper alloy, and, in a case in which H and O were introduced thereinto, an Ar—$N_2$—$H_2$ or Ar—$O_2$ gas mixture atmosphere was formed as the atmosphere during melting using high-purity Ar gas (with a dew point of −80° C. or lower), high-purity $N_2$ gas (with a dew point of −80° C. or lower), high-purity $O_2$ gas (with a dew point of −80° C. or lower), or high-purity $H_2$ gas (with a dew point of −80° C. or lower). In a case in which C was introduced thereinto, C was brought into contact with the molten metal by covering the surface of the molten metal with C particles during melting. In addition, in a case in which S was introduced thereinto, S was directly added to the molten metal. As a result, molten alloys having a component composition shown in Table 1 were produced and injected into a mold, thereby producing ingots. Meanwhile, the dimensions of the ingot were set to a thickness of approximately 120 mm, a width of approximately 220 mm, and a length of approximately 300 mm.

Subsequently, each ingot was subjected to cutting and surface grinding, and the components of the ingot were analyzed. Meanwhile, Mg and other added elements were analyzed using inductively coupled plasma-atomic emission spectrophotometry. In addition, H was analyzed using a thermal conductivity method, and O, S, and C were analyzed using an infrared absorption method.

A portion near the cast surface was subjected to face working, and a 100 mm×200 mm×100 mm block was cut out from the obtained ingot.

This block was heated in an Ar gas atmosphere for four hours under a temperature condition shown in Table 2, thereby carrying out a homogenization/solution treatment.

The copper material that had been subjected to the thermal treatment was appropriately cut in order to form a shape suitable as the final shape, and surface grinding was carried out in order to remove an oxide layer. After that, intermediate rolling was carried out at room temperature in a reduction rate shown in Table 2.

In addition, an intermediate thermal treatment was carried out on the obtained strip material in a salt bath under a condition shown in Table 2. After that, water quenching was carried out.

Next, finish rolling was carried out in a reduction rate shown in Table 2, and a thin plate having a thickness of 0.25 mm and a width of approximately 200 mm was produced. During the above-described finish rolling, rolling oil was applied to the surface, thereby carrying out cold rolling.

In addition, after the finish rolling, a finish thermal treatment was carried out in an Ar atmosphere under a condition shown in Table 2, and then water quenching was carried out, thereby producing a thin plate for characteristic evaluation.

(Evaluation of Workability)

As an evaluation of workability, the presence or absence of cracked edges during the above-described intermediate rolling and finish rolling was observed. A thin plate in which cracked edges were not or rarely visually observed was evaluated as A, a thin plate in which small cracked edges having a length of shorter than 1 mm were generated was evaluated as B, a thin plate in which small cracked edges having a length in a range of 1 mm to shorter than 3 mm were generated was evaluated as C, a thin plate in which large cracked edges having a length of 3 mm or longer were generated was evaluated as D, and a thin plate which was ruptured due to cracked edges in the middle of rolling was evaluated as E.

Meanwhile, the length of the cracked edge refers to the length of a cracked edge propagating toward the central portion from an end portion of a rolled material in the width direction.

(Observation of Precipitate)

Mirror polishing and ion etching were carried out on a rolled surface of each specimen. In order to confirm the precipitation state of an intermetallic compound including Cu and Mg as major components, a view magnified at 10000 times (approximately 120 $\mu m^2$/view) was observed using a field-emission scanning electron microscope (FE-SEM).

Next, in order to investigate the density (intermetallic compounds/$\mu m^2$) of the intermetallic compounds including Cu and Mg as major components, a view magnified at 10000 times (approximately 120 $\mu m^2$/view) in which the precipitation state of the intermetallic compound was not unique was selected, and, in that region, 10 continuous views magnified at 50000 times (approximately 4.8 $\mu m^2$/view) were photographed. As the particle diameter of the intermetallic compound, the average value of the long diameter (the length of a straight line drawn to be the longest in a grain under a condition in which the straight line does not come into contact with a grain boundary in the middle) and the short diameter (the length of a straight line drawn to be the longest in a direction intersecting the long diameter at a right angle under a condition in which the straight line does not come into contact with a grain boundary in the middle) of the intermetallic compound was used. In addition, the density (intermetallic compounds/$\mu m^2$) of the intermetallic compounds which had a particle diameter of 0.1 $\mu m$ or larger and included Cu and Mg as major components was obtained.

(Mechanical Properties)

A No. 13B test specimen regulated by JIS Z 2241 was sampled from a strip material for characteristic evaluation, and the 0.2% yield strength $\sigma_{0.2}$ was measured using the offset method of JIS Z 2241. In addition, Young's modulus was calculated from the slope of an elastic region. Meanwhile, the test specimen was sampled in a direction perpendicular to a rolling direction.

(Number of Times of Rupture in Tensile Test)

A tensile test was carried out ten times using the No. 13B test specimen, and the number of tensile test specimens ruptured in the elastic region before the yield point was reached was measured as the number of times of rupture in a tensile test. Meanwhile, the elastic region refers to a region in which a linear relationship in a stress-strain curve is satisfied. As the number of times of rupture increases, workability further degrades due to an inclusion.

(Conductivity)

A test specimen having a width of 10 mm and a length of 150 mm was sampled from the strip material for characteristic evaluation, and the electric resistance was obtained using a four-terminal method. In addition, the dimensions of the test specimen were measured using a micrometer, and the volume of the test specimen was computed. In addition, the conductivity was calculated from the measured electric resistance and the volume. Meanwhile, the test specimen was sampled so that the longitudinal direction of the test specimen became perpendicular to the rolling direction of the strip material for characteristic evaluation.

Conditions and evaluation results are shown in Tables 1, 2, and 3.

TABLE 1

| | | Component composition | | | | | | | Impurities (mass ppm) | | | | |
|---|---|---|---|---|---|---|---|---|---|---|---|---|---|
| | | Atomic % | | | | Mass % | | | | | | | |
| | | Mg | Other elements | | | Mg | Other elements | | | H | O | S | C | Cu |
| Invention Examples | 1 | 3.3 | — | — | — | 1.3 | — | — | — | 0.5 | 3.0 | 4.0 | 0.5 | Remainder |
| | 2 | 3.9 | — | — | — | 1.5 | — | — | — | 8.9 | 3.0 | 12 | 0.4 | Remainder |
| | 3 | 4.2 | — | — | — | 1.6 | — | — | — | 1.0 | 96 | 3.0 | 0.7 | Remainder |
| | 4 | 4.5 | — | — | — | 1.8 | — | — | — | 0.1 | 3.0 | 47 | 0.6 | Remainder |
| | 5 | 5.4 | — | — | — | 2.1 | — | — | — | 0.4 | 4.0 | 2.8 | 9.7 | Remainder |
| | 6 | 6.2 | — | — | — | 2.5 | — | — | — | 0.9 | 19 | 5.0 | 0.5 | Remainder |
| | 7 | 6.7 | — | — | — | 2.7 | — | — | — | 0.3 | 4.0 | 4.0 | 0.3 | Remainder |
| | 8 | 4.1 | Ti: 0.02 | Li: 0.15 | — | 1.6 | Ti: 0.02 | Li: 0.02 | — | 0.9 | 3.0 | 3.0 | 0.6 | Remainder |
| | 9 | 4.4 | Ni: 0.15 | Zn: 0.3 | — | 1.7 | Ni: 0.14 | Zn: 0.32 | — | 0.6 | 3.0 | 5.0 | 0.8 | Remainder |
| | 10 | 4.2 | P: 0.02 | Al: 0.25 | Si: 0.05 | 1.7 | P: 0.01 | Al: 0.11 | Si: 0.02 | 0.4 | 3.0 | 6.0 | 0.6 | Remainder |
| | 11 | 4.1 | Cr: 0.03 | Mn: 0.2 | — | 1.6 | Cr: 0.03 | Mn: 0.18 | — | 0.5 | 4.0 | 3.0 | 0.8 | Remainder |
| | 12 | 4.4 | Fe: 0.05 | Sn: 0.15 | Co: 0.03 | 1.7 | Fe: 0.05 | Sn: 0.29 | Co: 0.03 | 0.7 | 3.0 | 3.0 | 0.4 | Remainder |
| | 13 | 4.3 | Co: 0.15 | Zr: 0.02 | — | 1.7 | Co: 0.14 | Zr: 0.03 | — | 0.6 | 3.0 | 5.0 | 0.5 | Remainder |
| | 14 | 4.2 | Zn: 0.5 | — | — | 1.7 | Zn: 0.53 | — | — | 0.4 | 4.0 | 6.0 | 0.6 | Remainder |
| Comparative Examples | 1 | 1.9 | — | — | — | 0.7 | — | — | — | 0.3 | 4.0 | 4.0 | 0.3 | Remainder |
| | 2 | 8.8 | — | — | — | 3.6 | — | — | — | 0.9 | 3.0 | 3.0 | 0.6 | Remainder |
| | 3 | 4.2 | — | — | — | 1.7 | — | — | — | 49 | 3.0 | 2.0 | 3.0 | Remainder |
| | 4 | 4.9 | — | — | — | 1.9 | — | — | — | 1.0 | 352 | 2.0 | 3.0 | Remainder |
| | 5 | 4.9 | — | — | — | 1.9 | — | — | — | 1.0 | 1.0 | 182 | 2.0 | Remainder |
| | 6 | 5.1 | — | — | — | 2.0 | — | — | — | 2.0 | 2.0 | 1.0 | 23 | Remainder |

TABLE 2

| | | Manufacturing conditions | | | | | | |
|---|---|---|---|---|---|---|---|---|
| | | Homogenization/ solid solution formation | Intermediate processing rate | Intermediate annealing | | Finish rolling rate | Finish thermal treatment | |
| | | | | Temperature | Time | | Temperature | Time |
| Invention Examples | 1 | 750 | 98% | 500° C. | 300 sec | 50% | 290° C. | 50 sec |
| | 2 | 700 | 80% | 550° C. | 5 sec | 50% | 290° C. | 40 sec |
| | 3 | 720 | 90% | 520° C. | 60 sec | 45% | 310° C. | 50 sec |
| | 4 | 720 | 90% | 620° C. | 90 sec | 50% | 320° C. | 60 sec |
| | 5 | 720 | 60% | 580° C. | 110 sec | 40% | 320° C. | 50 sec |
| | 6 | 720 | 70% | 690° C. | 80 sec | 45% | 300° C. | 70 sec |
| | 7 | 720 | 80% | 650° C. | 50 sec | 40% | 320° C. | 40 sec |
| | 8 | 720 | 65% | 580° C. | 80 sec | 55% | 290° C. | 60 sec |
| | 9 | 720 | 90% | 560° C. | 90 sec | 50% | 280° C. | 60 sec |
| | 10 | 720 | 50% | 600° C. | 80 sec | 55% | 290° C. | 40 sec |
| | 11 | 720 | 80% | 620° C. | 60 sec | 55% | 310° C. | 80 sec |
| | 12 | 720 | 90% | 690° C. | 90 sec | 50% | 280° C. | 50 sec |
| | 13 | 720 | 90% | 650° C. | 90 sec | 50% | 200° C. | 60 sec |
| | 14 | 720 | 95% | 540° C. | 70 sec | 55% | 300° C. | 60 sec |
| Comparative Examples | 1 | 750 | 50% | 600° C. | 60 sec | 40% | 320° C. | 60 sec |
| | 2 | 710 | — | — | — | — | — | — |
| | 3 | 710 | 60% | 650° C. | 10 sec | 70% | 300° C. | 60 sec |
| | 4 | 720 | 50% | 600° C. | 10 sec | 50% | 300° C. | 60 sec |
| | 5 | 720 | 60% | 600° C. | 30 sec | 60% | 280° C. | 80 sec |
| | 6 | 720 | 50% | 650° C. | 30 sec | 70% | 250° C. | 30 sec |

TABLE 3

| | | Cracked edge | Precipitates (precipitates/μm$^2$) | | 0.2% yield strength MPa | Number of times of rupture in tensile test times/10 | Conductivity % IACS |
|---|---|---|---|---|---|---|---|
| | | | Grain size 0.05 μm or larger | Grain size 0.1 μm or larger | | | |
| Invention Examples | 1 | A | 0 | 0 | 599 | 0 | 47% |
| | 2 | B | 0 | 0 | 677 | 1 | 42% |
| | 3 | B | 3.1 | 1.2 | 648 | 1 | 41% |
| | 4 | B | 0 | 0 | 639 | 1 | 39% |
| | 5 | B | 2.1 | 0.6 | 614 | 1 | 36% |
| | 6 | B | 0 | 0 | 695 | 0 | 34% |

TABLE 3-continued

|  |  | Cracked edge | Precipitates (precipitates/μm²) | | 0.2% yield strength MPa | Number of times of rupture in tensile test times/10 | Conductivity % IACS |
|---|---|---|---|---|---|---|---|
|  |  |  | Grain size 0.05 μm or larger | Grain size 0.1 μm or larger |  |  |  |
|  | 7 | A | 0 | 0 | 674 | 0 | 31% |
|  | 8 | A | 0 | 0 | 670 | 0 | 37% |
|  | 9 | A | 0 | 0 | 670 | 0 | 36% |
|  | 10 | A | 0 | 0 | 674 | 0 | 34% |
|  | 11 | A | 0 | 0 | 660 | 0 | 33% |
|  | 12 | A | 0 | 0 | 665 | 0 | 30% |
|  | 13 | A | 0 | 0 | 676 | 0 | 30% |
|  | 14 | A | 0 | 0 | 669 | 0 | 38% |
| Comparative Examples | 1 | A | 0 | 0 | 453 | 0 | 62% |
|  | 2 | E | — | — | — | — | — |
|  | 3 | C | 0 | 0 | — | 10 | 40% |
|  | 4 | C | 0 | 0 | 605 | 8 | 37% |
|  | 5 | C | 0 | 0 | 630 | 8 | 35% |
|  | 6 | B | 0 | 0 | 642 | 6 | 34% |

In Comparative Example 1 in which the content of Mg was below the range of the present invention, the 0.2% yield strength was as low as 453 MPa.

In Comparative Example 2 in which the content of Mg was above the range of the present invention, large cracked edges were generated during the intermediate rolling, and it was not possible to carry out the subsequent characteristic evaluation.

In Comparative Example 3 in which the content of H was above the range of the present invention, cracked edges having a length of 1 mm or longer were generated during the intermediate rolling. In addition, while the tensile test was carried out ten times, all the tensile test specimens were ruptured in the elastic region, and it was not possible to measure the 0.2% yield strength $\sigma_{0.2}$.

In Comparative Example 4 in which the content of O was above the range of the present invention and Comparative Example 5 in which the content of S was above the range of the present invention, cracked edges having a length of 1 mm or longer were generated during the intermediate rolling. In addition, the tensile test was carried out ten times, and consequently, rupture of the tensile test specimen occurred in the elastic region eight times, and it was determined that the workability deteriorated due to an inclusion.

In Comparative Example 6 in which the content of C was above the range of the present invention, the tensile test was carried out ten times, and consequently, rupture of the tensile test specimen occurred in the elastic region six times, and it was determined that the workability deteriorated due to an inclusion.

In contrast, in Invention Examples 1 to 7 in which the contents of Mg, H, O, S, and C were within the ranges of the present invention, the 0.2% yield strengths were high, cracked edges were not generated, and rupture in the elastic region was also not observed in the tensile test.

In addition, in Invention Examples 8 to 14 in which the contents of Mg, H, O, S, and C were within the ranges of the present invention and furthermore, additive elements were included, the 0.2% yield strengths were high, cracked edges were not generated, and rupture in the elastic region was also not observed in the tensile test.

Based on the above, it was confirmed that it is possible to provide a copper alloy for electronic and electrical devices which has excellent mechanical properties and is capable of suppressing generation of defects even in a case in which the copper alloy is worked to a thin plate thickness or a smaller wire diameter than in the related art, a plastically-worked copper alloy material, and a component and a terminal for electronic and electrical devices.

Example 2

Next, ingots having a component composition shown in Table 4 were produced using the same method as in Example 1. Meanwhile, the dimensions of the ingot were set to a thickness of approximately 150 mm, a width of approximately 350 mm, and a length of approximately 2000 mm. A portion near the cast surface was faced 10 mm or more from the obtained ingot, and a 100 mm×200 mm×100 mm block was cut out.

This block was heated in an Ar gas atmosphere for four hours under a temperature condition shown in Table 5, thereby carrying out a homogenization/solution treatment.

After that, coarse rolling was carried out as rough working under conditions shown in Table 5, then, a thermal treatment was carried out using a salt bath for one hour under a temperature condition shown in Table 1, and water quenching was carried out.

The copper material that had been subjected to the thermal treatment was cut, and surface grinding was carried out in order to remove an oxide layer. After that, intermediate rolling was carried out at room temperature in a reduction rate shown in Table 5.

In addition, an intermediate thermal treatment was carried out on the obtained strip material in a salt bath under a condition shown in Table 5. After that, water quenching was carried out.

Next, finish rolling was carried out in a reduction rate shown in Table 5, and a thin plate having a thickness of 0.25 mm and a width of approximately 200 mm was produced. During the above-described finish rolling, a rolling oil was applied to the surface, thereby carrying out cold rolling.

In addition, after the finish rolling, a finish thermal treatment was carried out in an Ar atmosphere under a condition shown in Table 5, and then water quenching was carried out, thereby producing a thin plate for characteristic evaluation.

In the same manner as in Example 1, workability evaluation (presence or absence of cracked edges during the intermediate rolling and the finish rolling), precipitate observation, and measurement of the 0.2% yield strength and the conductivity were carried out. In addition, the X-ray diffraction intensity and bendability were evaluated in an order described below.

(X-Ray Diffraction Intensity)

The X-ray diffraction intensity from a {111} plane in a plate surface I{111}, the X-ray diffraction intensity from a {200} plane I{200}, the X-ray diffraction intensity from a {220} plane I{220}, the X-ray diffraction intensity from a {311} plane I{311} are measured in the following order. A measurement specimen was sampled from the thin plate for characteristic evaluation, and the X-ray diffraction intensities around one rotational axis were measured in the measurement specimen using a reflection method. Cu was used as a target, and an X-ray of Kα was used. The X-ray diffraction intensity was measured under conditions of a tube current of 40 mA, a tube voltage of 40 kV, a measurement angle in a range of 40° to 150°, and a measurement step of 0.02°. An integrated X-ray diffraction intensity I obtained by removing the background of the X-ray diffraction intensity and then combining Kα1 and Kα2 of a peak from each diffraction plane in a profile between the diffraction angle and the X-ray diffraction intensity was obtained, and the value of R{220} was obtained from the following expression.

$$R\{220\}=I\{220\}/(I\{111\}+I\{200\}+I\{220\}+I\{311\})$$

(Bendability)

Bending working was carried out on the basis of the method of Japan Copper and Brass Association Technical Standard JCBA-T307:2007, the testing method 4.

A plurality of test specimens having a width of 10 mm and a length of 30 mm were sampled from the strip material for characteristic evaluation so that the longitudinal direction of the test specimen became perpendicular to the rolling direction, and a W bending test was carried out using a W-shaped jig having a bending angle of 90 degrees and a bending radius of 0.25 mm.

In addition, the outer circumferential portion of the bent portion was visually checked, and a test specimen in which cracking was observed was determined to be B, and a test specimen in which rupture or fine cracks could not be confirmed was determined to be A.

Component compositions, manufacturing conditions, and evaluation results are shown in Tables 4, 5, and 6.

TABLE 4

| | | Component composition | | | | | | | Impurities (mass ppm) | | | | |
|---|---|---|---|---|---|---|---|---|---|---|---|---|---|
| | | Atomic % | | | | Mass % | | | | | | | |
| | | Mg | Other elements | | | Mg | Other elements | | | H | O | S | C | Cu |
| Invention Examples | 101 | 3.3 | — | — | — | 1.3 | — | — | — | 0.3 | 2.5 | 3.8 | 0.2 | Remainder |
| | 102 | 4.0 | — | — | — | 1.6 | — | — | — | 0.4 | 2.6 | 4 | 0.2 | Remainder |
| | 103 | 4.2 | — | — | — | 1.7 | — | — | — | 0.6 | 96 | 2.5 | 0.2 | Remainder |
| | 104 | 4.7 | — | — | — | 1.9 | — | — | — | 0.2 | 3.1 | 5 | 0.5 | Remainder |
| | 105 | 5.5 | — | — | — | 2.2 | — | — | — | 0.4 | 2.1 | 2.6 | 8.9 | Remainder |
| | 106 | 6.2 | — | — | — | 2.5 | — | — | — | 8.9 | 14 | 4.8 | 0.5 | Remainder |
| | 107 | 6.7 | — | — | — | 2.7 | — | — | — | 0.6 | 3.5 | 2.1 | 0.6 | Remainder |
| | 108 | 4.1 | Ti: 0.02 | Li: 0.05 | — | 1.6 | Ti: 0.02 | Li: 0.006 | — | 0.9 | 3.1 | 46.0 | 0.2 | Remainder |
| | 109 | 4.2 | Ni: 0.15 | Zn: 0.30 | — | 1.7 | Ni: 0.14 | Zn: 0.32 | — | 0.5 | 3.1 | 4.6 | 0.2 | Remainder |
| | 110 | 4.2 | P: 0.02 | Al: 0.25 | Si: 0.05 | 1.7 | P: 0.01 | Al: 0.11 | Si: 0.02 | 0.6 | 2.9 | 4.6 | 0.3 | Remainder |
| | 111 | 4.3 | Cr: 0.03 | Mn: 0.20 | — | 1.7 | Cr: 0.03 | Mn: 0.18 | — | 0.4 | 2.9 | 3.5 | 0.3 | Remainder |
| | 112 | 4.3 | Fe: 0.05 | Sn: 0.15 | Co: 0.03 | 1.7 | Fe: 0.05 | Sn: 0.29 | Co: 0.03 | 0.6 | 3.5 | 3.1 | 0.4 | Remainder |
| | 113 | 4.2 | Co: 0.03 | — | — | 1.7 | Co: 0.03 | — | — | 0.5 | 2.8 | 4.8 | 0.2 | Remainder |
| | 114 | 4.1 | Zr: 0.02 | — | — | 1.6 | Zr: 0.03 | — | — | 0.4 | 2.8 | 5.8 | 0.2 | Remainder |

TABLE 5

| | | Manufacturing conditions | | | | | | | | |
|---|---|---|---|---|---|---|---|---|---|---|
| | | Homogenization/ solid solution formation | Rough working processing rate | Thermal treatment temperature | Intermediate processing rate | Intermediate annealing | | Finish rolling ratio | Finish thermal treatment | |
| | | | | | | Temperature | Time | | Temperature | Time |
| Invention Examples | 101 | 750 | 70% | 750° C. | 50% | 520° C. | 10 sec | 45% | 290° C. | 50 sec |
| | 102 | 700 | 50% | 700° C. | 60% | 560° C. | 10 sec | 45% | 290° C. | 40 sec |
| | 103 | 720 | 60% | 720° C. | 40% | 540° C. | 10 sec | 40% | 310° C. | 50 sec |
| | 104 | 720 | 60% | 720° C. | 50% | 600° C. | 10 sec | 40% | 320° C. | 60 sec |
| | 105 | 720 | 50% | 720° C. | 60% | 590° C. | 10 sec | 35% | 320° C. | 50 sec |
| | 106 | 720 | 40% | 720° C. | 50% | 700° C. | 10 sec | 30% | 280° C. | 70 sec |
| | 107 | 720 | 60% | 720° C. | 55% | 590° C. | 10 sec | 30% | 320° C. | 40 sec |
| | 108 | 720 | 60% | 720° C. | 80% | 580° C. | 10 sec | 45% | 290° C. | 60 sec |
| | 109 | 720 | 50% | 720° C. | 50% | 550° C. | 10 sec | 40% | 320° C. | 60 sec |
| | 110 | 720 | 50% | 720° C. | 60% | 560° C. | 10 sec | 45% | 290° C. | 40 sec |
| | 111 | 720 | 50% | 720° C. | 50% | 650° C. | 10 sec | 45% | 310° C. | 80 sec |
| | 112 | 720 | 80% | 720° C. | 30% | 700° C. | 10 sec | 40% | 280° C. | 50 sec |
| | 113 | 720 | 80% | 720° C. | 40% | 650° C. | 10 sec | 45% | 300° C. | 60 sec |
| | 114 | 720 | 60% | 720° C. | 40% | 540° C. | 10 sec | 45% | 300° C. | 60 sec |

TABLE 6

| | | Cracked edge | Precipitates (precipitates/μm²) | | R{220} | 0.2% yield strength MPa | Conductivity % IACS | Bendability | Number of times of rupture in tensile test times/10 |
| --- | --- | --- | --- | --- | --- | --- | --- | --- | --- |
| | | | Grain size 0.05 μm or larger | Grain size 0.1 μm or larger | | | | | |
| Invention Examples | 101 | A | 3 | 0.8 | 0.75 | 616 | 47% | A | 0 |
| | 102 | A | 0 | 0 | 0.78 | 649 | 42% | A | 0 |
| | 103 | A | 0 | 0 | 0.76 | 614 | 41% | A | 1 |
| | 104 | A | 1.2 | 0.6 | 0.67 | 632 | 39% | A | 0 |
| | 105 | A | 0 | 0 | 0.70 | 636 | 36% | A | 1 |
| | 106 | A | 0 | 0 | 0.50 | 655 | 34% | A | 1 |
| | 107 | A | 3.5 | 1.4 | 0.78 | 658 | 31% | A | 0 |
| | 108 | A | 0 | 0 | 0.75 | 653 | 37% | A | 1 |
| | 109 | A | 0 | 0 | 0.76 | 609 | 37% | A | 0 |
| | 110 | A | 0 | 0 | 0.78 | 658 | 34% | A | 0 |
| | 111 | A | 0 | 0 | 0.59 | 652 | 33% | A | 0 |
| | 112 | A | 0 | 0 | 0.42 | 634 | 31% | A | 0 |
| | 113 | A | 0 | 0 | 0.65 | 653 | 38% | A | 0 |
| | 114 | A | 0 | 0 | 0.78 | 648 | 38% | A | 0 |

In Invention Examples 101 to 114 in which the fraction R{220} of the X-ray diffraction intensity from the {220} plane was set to 0.9 or lower, it was confirmed that the 0.2% yield strength was high, bendability was also favorable, and the proof stress-bending balance was excellent.

Example 3

Next, ingots having a component composition shown in Table 7 were produced using the same method as in Example 1. Meanwhile, the dimensions of the ingot were set to a thickness of approximately 150 mm, a width of approximately 350 mm, and a length of approximately 2000 mm. A portion near the cast surface was faced 10 mm or more from the obtained ingot, and a 100 mm×200 mm×100 mm block was cut out.

This block was heated in an Ar gas atmosphere for four hours under a temperature condition shown in Table 8, thereby carrying out a homogenization/solution treatment.

The copper material that had been subjected to the thermal treatment was cut, and surface grinding was carried out in order to remove an oxide layer.

After that, intermediate rolling was carried out at room temperature in a reduction rate shown in Table 1. In addition, an intermediate thermal treatment was carried out on the obtained strip material in a salt bath under a condition shown in Table 8. After that, quenching was carried out.

Next, finish rolling was carried out in a reduction rate shown in Table 8, and a strip material having a thickness of 0.25 mm and a width of approximately 200 mm was produced.

In addition, after the finish rolling, a finish thermal treatment was carried out in an Ar atmosphere under a condition shown in Table 8, and then water quenching was carried out, thereby producing a strip material for characteristic evaluation.

In the same manner as in Example 1, workability evaluation (presence or absence of cracked edges during the intermediate rolling and the finish rolling), precipitate observation, and measurement of the conductivity were carried out. In addition, the average crystal particle diameter and the mechanical properties were evaluated in an order described below.

(Average Crystal Grain Size)

In each specimen, the rolled surface was mirror-polished and then was etched. The surface was photographed so that the rolling direction lay horizontally in the photograph, and a view magnified at 1000 times (approximately 300 μm²× 200 μm²) was observed. In addition, regarding crystal grain sizes, five vertical lines and five horizontal lines having a predetermined length were drawn on the photograph according to the cutting method of JIS H 0501, the number of crystal grains that were completely cut was counted, and the average value of those cut lengths was computed as the average crystal grain size.

In a case in which the crystal grain size was as fine as 10 μm or shorter, the average crystal particle diameter was measured using a SEM-EBSD (Electron Backscatter Diffraction Patterns) measurement instrument. Mechanical polishing was carried out using waterproof abrasive paper and diamond abrasive grains, and then finish polishing was carried out using a colloidal silica solution. After that, electron beams were applied to individual measurement points (pixels) in a measurement range on the specimen surface using a scanning electron microscope, and, by means of an orientation analysis using backscatter electron diffraction, a portion between measurement points in which the orientation difference between adjacent measurement points reached 15° or higher was considered as a large tile grain boundary, and a portion between measurement points in which the orientation difference between adjacent measurement points was 15° or lower was considered as a small tile grain boundary. A crystal grain boundary map was produced using the large tilt grain boundary, five vertical lines and five horizontal lines having a predetermined length were drawn on the crystal grain boundary map according to the cutting method of JIS H 0501, the number of crystal grains that were completely cut was counted, and the average value of those cut lengths was considered as the average crystal grain size.

(Mechanical Properties)

A No. 13B test specimen defined by JIS Z 2241 was sampled from a strip material for characteristic evaluation, and the strength TS and the 0.2% yield strength YS were measured using the offset method of JIS Z 2241. Meanwhile, the test specimen was sampled in a direction parallel to a rolling direction. In addition, a yield ratio YS/TS was calculated from the obtained strength TS and 0.2% yield strength YS.

Component compositions, manufacturing conditions, and evaluation results are shown in Tables 7, 8, and 9.

TABLE 7

| | | Component composition | | | | | | | | | | |
|---|---|---|---|---|---|---|---|---|---|---|---|---|
| | | Atomic % | | | | Mass % | | | | Impurities (mass ppm) | | | | |
| | | Mg | Other elements | | | Mg | Other elements | | | H | O | S | C | Cu |
| Invention Examples | 201 | 3.5 | — | — | — | 1.4 | — | — | — | 0.2 | 90.0 | 2.0 | 0.2 | Remainder |
| | 202 | 4.1 | — | — | — | 1.6 | — | — | — | 4.5 | 2.5 | 2 | 0.3 | Remainder |
| | 203 | 4.3 | — | — | — | 1.7 | — | — | — | 0.5 | 3 | 2.0 | 0.2 | Remainder |
| | 204 | 4.5 | — | — | — | 1.8 | — | — | — | 1.0 | 2.5 | 2 | 0.3 | Remainder |
| | 205 | 5.1 | — | — | — | 2.0 | — | — | — | 0.5 | 2.3 | 44.0 | 0.5 | Remainder |
| | 206 | 6.3 | — | — | — | 2.5 | — | — | — | 0.5 | 4 | 4.5 | 0.2 | Remainder |
| | 207 | 6.8 | — | — | — | 2.7 | — | — | — | 8.8 | 3.1 | 2.3 | 0.2 | Remainder |
| | 208 | 4.2 | Co: 0.03 | — | — | 1.7 | Co: 0.03 | — | — | 0.3 | 2.5 | 2.1 | 7.7 | Remainder |
| | 209 | 3.9 | Ni: 0.20 | Li: 0.05 | — | 1.5 | Ni: 0.2 | Li: 0.006 | — | 0.3 | 2.5 | 2.2 | 0.2 | Remainder |
| | 210 | 4.3 | P: 0.03 | Zn: 0.30 | Si: 0.05 | 1.7 | P: 0.02 | Zn: 0.32 | Si: 0.02 | 0.5 | 2.6 | 1.5 | 0.4 | Remainder |
| | 211 | 4.1 | Cr: 0.03 | Mn: 0.1 | — | 1.6 | Cr: 0.03 | Mn: 0.09 | — | 0.4 | 3.2 | 2.1 | 0.5 | Remainder |
| | 212 | 4.1 | Al: 0.20 | Fe: 0.05 | — | 1.6 | Al: 0.09 | Fe: 0.05 | — | 0.6 | 3.5 | 2.1 | 0.5 | Remainder |
| | 213 | 4.2 | Co: 0.05 | Ti: 0.05 | — | 1.7 | Co: 0.05 | Ti: 0.04 | — | 0.3 | 2.8 | 2.3 | 0.5 | Remainder |
| | 214 | 3.9 | Zr: 0.02 | Sn: 0.20 | — | 1.5 | Zr: 0.03 | Sn: 0.38 | — | 0.3 | 2.8 | 2.6 | 0.3 | Remainder |

TABLE 8

| | | Manufacturing conditions | | | | | | |
|---|---|---|---|---|---|---|---|---|
| | | Homogenization/ solid solution formation | Intermediate processing rate | Intermediate annealing | | Finish rolling reduction rate | Finish thermal treatment | |
| | | | | Temperature | Time | | Temperature | Time |
| Invention Examples | 201 | 750° C. | 60% | 520° C. | 15 sec | 45% | 300° C. | 55 sec |
| | 202 | 700° C. | 70% | 560° C. | 5 sec | 50% | 350° C. | 60 sec |
| | 203 | 720° C. | 50% | 540° C. | 10 sec | 40% | 200° C. | 1800 sec |
| | 204 | 720° C. | 40% | 600° C. | 20 sec | 40% | 250° C. | 60 sec |
| | 205 | 720° C. | 60% | 590° C. | 20 sec | 35% | 300° C. | 30 sec |
| | 206 | 720° C. | 50% | 700° C. | 60 sec | 40% | 350° C. | 30 sec |
| | 207 | 720° C. | 60% | 590° C. | 60 sec | 30% | 280° C. | 50 sec |
| | 208 | 720° C. | 50% | 580° C. | 5 sec | 45% | 260° C. | 100 sec |
| | 209 | 720° C. | 80% | 550° C. | 15 sec | 40% | 300° C. | 3600 sec |
| | 210 | 720° C. | 60% | 560° C. | 15 sec | 45% | 240° C. | 60 sec |
| | 211 | 720° C. | 60% | 650° C. | 60 sec | 45% | 250° C. | 80 sec |
| | 212 | 720° C. | 50% | 700° C. | 5 sec | 50% | 370° C. | 40 sec |
| | 213 | 720° C. | 30% | 650° C. | 30 sec | 50% | 350° C. | 60 sec |
| | 214 | 720° C. | 50% | 540° C. | 10 sec | 45% | 270° C. | 120 sec |

TABLE 9

| | | Cracked edge | Precipitates (precipitates/μm²) Grain size 0.05 μm or larger | Precipitates (precipitates/μm²) Grain size 0.1 μm or larger | Average crystal grain size μm | 0.2% yield strength YS MPa | Strength TS MPa | Yield ratio YS/TS | Conductivity % IACS | Bendability | Number of times of rupture in tensile test times/10 |
|---|---|---|---|---|---|---|---|---|---|---|---|
| Invention Example | 201 | A | 3 | 0.8 | 1.5 | 606 | 634 | 95.6% | 46% | A | 1 |
| | 202 | A | 0 | 0 | 2.3 | 624 | 669 | 93.2% | 42% | A | 0 |
| | 203 | A | 0 | 0 | 2.4 | 662 | 670 | 98.9% | 41% | A | 0 |
| | 204 | A | 0 | 0 | 6.7 | 652 | 666 | 97.9% | 40% | A | 0 |
| | 205 | A | 0 | 0 | 5.9 | 621 | 641 | 96.8% | 37% | A | 1 |
| | 206 | A | 0 | 0 | 48.5 | 666 | 704 | 94.6% | 33% | A | 0 |
| | 207 | A | 3.5 | 1.4 | 6.4 | 688 | 703 | 97.9% | 31% | A | 1 |
| | 208 | A | 3.2 | 1.2 | 3.3 | 670 | 690 | 97.1% | 38% | A | 1 |
| | 209 | A | 0 | 0 | 3.5 | 608 | 628 | 96.8% | 38% | A | 0 |
| | 210 | A | 0 | 0 | 3.5 | 682 | 706 | 96.6% | 35% | A | 0 |
| | 211 | A | 0 | 0 | 20.3 | 668 | 691 | 96.7% | 36% | A | 0 |
| | 212 | A | 0 | 0 | 26.8 | 615 | 680 | 90.4% | 34% | A | 0 |
| | 213 | A | 0 | 0 | 18.3 | 637 | 684 | 93.1% | 32% | A | 0 |
| | 214 | A | 0 | 0 | 3.1 | 652 | 679 | 96.0% | 34% | A | 0 |

In Invention Examples 201 to 214, the yield ratios YS/TS all exceeded 90%, and both the strength TS and the 0.2% yield strength became high. Furthermore, it was confirmed that the bendability was favorable.

INDUSTRIAL APPLICABILITY

When the copper alloy for electronic and electrical devices of the present invention is used, it is possible to improve the manufacturing yield.

The invention claimed is:

1. A copper alloy for electronic and electrical devices, comprising:
   Mg in a range of 1.3 mass % to 2.8 mass %; and
   a remainder substantially being Cu and inevitable impurities,
   wherein a content of H is set to 10 mass ppm or lower, a content of O is set to 100 mass ppm or lower, a content of S is set to 50 mass ppm or lower, and a content of C is set to 10 mass ppm or lower, and
   wherein, R{220} is 0.9 or lower, where an X-ray diffraction intensity from a {111} plane on a plate surface is represented by I{111}, an X-ray diffraction intensity from a {200} plane on the plate surface is represented by I{200}, an X-ray diffraction intensity from a {220} plane on the plate surface is represented by I{220}, an X-ray diffraction intensity from a {311} plane on the plate surface is represented by I{311}, and a fraction {220} of the X-ray diffraction intensity from the {220} plane on the plate surface is R{220}=I{220}/(I{111}+I{200}+I{220}+I{311}).

2. The copper alloy for electronic and electrical devices according to claim 1,
   wherein, in a scanning electron microscopic observation, an average number of intermetallic compounds which have a particle diameter of 0.1 μm or larger and include Cu and Mg as major components is set to 1 compound/μm$^2$ or less.

3. The copper alloy for electronic and electrical devices according to claim 1,
   wherein, in a case where a content of Mg is defined as A atomic %, a conductivity σ (% IACS) is set in a range of σ≤1.7241/(−0.0347×A$^2$+0.6569×A+1.7)×100.

4. The copper alloy for electronic and electrical devices according to claim 1, comprising:
   one or more of Sn, Zn, Al, Ni, Si, Mn, Li, Ti, Fe, Co, Cr, Zr, and P in a range of 0.01 mass % to 3.0 mass % in total.

5. The copper alloy for electronic and electrical devices according to claim 1,
   wherein the copper alloy for electronic and electrical devices has mechanical properties such that a 0.2% yield strength is 400 MPa or higher.

6. The copper alloy for electronic and electrical devices according to claim 1,
   wherein R{220} is set in a range of 0.3 to 0.9.

7. The copper alloy for electronic and electrical devices according to claim 1,
   wherein a yield ratio YS/TS, which is calculated from a strength TS and a 0.2% yield strength YS obtained in a tensile test carried out in a direction parallel to a rolling direction, exceeds 90%.

8. The copper alloy for electronic and electrical devices according to claim 7,
   wherein an average crystal grain size is set to 50 μm or smaller.

9. A plastically-worked copper alloy material for electronic and electrical devices formed by plastically working a copper material made of the copper alloy for electronic and electrical devices according to claim 1.

10. The plastically-worked copper alloy material for electronic and electrical devices according to claim 9, wherein the copper alloy material is metal-formed by a manufacturing method including a heat treatment step of heating a copper material to a temperature in a range of 400° C. to 900° C. and cooling the heated copper material to 200° C. or lower at a cooling rate of 60° C./min or greater and a plastic working step of plastically working the copper material.

11. The plastically-worked copper alloy material for electronic and electrical devices according to claim 9,
    wherein Sn plating is carried out on a surface of the plastically-worked copper alloy material for electronic and electrical devices.

12. A component for electronic and electrical devices made of the plastically-worked copper alloy material for electronic and electrical devices according to claim 9.

13. A terminal made of the plastically-worked copper alloy material for electronic and electrical devices according to claim 9.

* * * * *